US011419143B2

(12) United States Patent
Abedini et al.

(10) Patent No.: US 11,419,143 B2
(45) Date of Patent: Aug. 16, 2022

(54) RANDOM ACCESS PROCEDURE IN A WIRELESS BACKHAUL NETWORK

(71) Applicant: QUALCOMM Incorporated, San Diego, CA (US)

(72) Inventors: Navid Abedini, Somerset, NJ (US); Muhammad Nazmul Islam, Littleton, MA (US); Sundar Subramanian, San Diego, CA (US); Karl Georg Hampel, Hoboken, NJ (US); Juergen Cezanne, Ocean Township, NJ (US); Junyi Li, Chester, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 16/210,819

(22) Filed: Dec. 5, 2018

(65) Prior Publication Data

US 2019/0116613 A1     Apr. 18, 2019

Related U.S. Application Data

(63) Continuation-in-part of application No. 15/976,652, filed on May 10, 2018.
(Continued)

(51) Int. Cl.
*H04W 74/02* (2009.01)
*H04W 74/08* (2009.01)
*H04W 92/20* (2009.01)

(52) U.S. Cl.
CPC ....... *H04W 74/02* (2013.01); *H04W 74/0833* (2013.01); *H04W 92/20* (2013.01)

(58) Field of Classification Search
CPC ... H04W 74/00; H04W 74/02; H04W 74/004; H04W 74/008; H04W 74/08;
(Continued)

(56) References Cited

U.S. PATENT DOCUMENTS 6,408,178 B1   6/2002 Wickstrom et al.
9,572,088 B2   2/2017 Lee et al.
(Continued)

OTHER PUBLICATIONS

Ericsson: "Beamforming Impact on Random Access", 3GPP Draft; R2-1704099—Beamforming Impact on Random Access, 3rd Generation Partnership Project (3GPP), Mobile Competence Centre; 650, Route Des Lucioles; F-06921, Sophia-Antipolis Cedex; France, vol. RAN WG2, No. Hangzhou; May 15, 2017-May 19, 2017 May 14, 2017, XP051274707, Retrieved from the Internet: URL:http://www.3gpp.org/ftp/Meetings_3GPP_SYNC/RAN2/Docs/ [retrieved on May 14, 2017], 4 pages.
(Continued)

*Primary Examiner* — Jeffrey M Rutkowski
*Assistant Examiner* — Sudesh M Patidar
(74) *Attorney, Agent, or Firm* — Harrity & Harrity, LLP

(57) ABSTRACT

Certain aspects of the present disclosure generally relate to wireless communication. In some aspects, a base station may determine a transmission configuration for a first random access message based at least in part on one or more parameters associated with a target base station for initiating a backhaul connection. The transmission configuration may include information associated with a physical random access channel (PRACH) resource associated with transmitting the first random access message. The PRACH resource differs from a PRACH resource associated with a transmission of a random access message by a user equipment. The base station may transmit the first random access message using the transmission configuration. Numerous other aspects are provided.

34 Claims, 14 Drawing Sheets

Related U.S. Application Data

(60) Provisional application No. 62/692,446, filed on Jun. 29, 2018, provisional application No. 62/547,538, filed on Aug. 18, 2017, provisional application No. 62/517,029, filed on Jun. 8, 2017.

(58) Field of Classification Search
CPC ......... H04W 74/0875; H04W 74/0833; H04W 92/20; H04W 92/045; H04W 92/12; H04W 92/14; H04W 92/22; H04W 92/24
See application file for complete search history.

(56) References Cited

U.S. PATENT DOCUMENTS

| | | | |
|---|---|---|---|
| 9,763,151 B2 | 9/2017 | Kim et al. | |
| 9,894,627 B2 | 2/2018 | Choi et al. | |
| 10,149,310 B1 | 12/2018 | Manchanda et al. | |
| 2010/0195607 A1* | 8/2010 | Lee | H04W 74/0866 370/329 |
| 2011/0013542 A1* | 1/2011 | Yu | H04W 74/006 370/280 |
| 2011/0310791 A1 | 12/2011 | Prakash et al. | |
| 2012/0069793 A1 | 3/2012 | Chung et al. | |
| 2012/0077507 A1* | 3/2012 | Lee | H04W 74/006 455/450 |
| 2012/0082088 A1* | 4/2012 | Dalsgaard | H04W 74/0875 370/315 |
| 2012/0300752 A1* | 11/2012 | Kwon | H04W 56/001 370/336 |
| 2013/0201966 A1 | 8/2013 | Weng et al. | |
| 2013/0242730 A1* | 9/2013 | Pelletier | H04L 1/0046 370/230 |
| 2015/0043445 A1 | 2/2015 | Xiong et al. | |
| 2015/0109943 A1 | 4/2015 | Sahin et al. | |
| 2015/0382214 A1 | 12/2015 | Cheng et al. | |
| 2016/0029358 A1* | 1/2016 | Hou | H04W 74/0833 370/329 |
| 2016/0212625 A1 | 7/2016 | Damnjanovic et al. | |
| 2016/0219634 A1 | 7/2016 | Lu et al. | |
| 2016/0227573 A1 | 8/2016 | Quan et al. | |
| 2017/0006547 A1* | 1/2017 | Fujishiro | H04W 16/32 |
| 2017/0048775 A1 | 2/2017 | Kim | |
| 2017/0078935 A1 | 3/2017 | Hahn et al. | |
| 2017/0231011 A1 | 8/2017 | Park et al. | |
| 2017/0331577 A1* | 11/2017 | Parkvall | H04L 5/1469 |
| 2018/0054725 A1 | 2/2018 | Agiwal et al. | |
| 2018/0076877 A1 | 3/2018 | Liu et al. | |
| 2018/0092139 A1 | 3/2018 | Novlan et al. | |
| 2018/0098298 A1* | 4/2018 | Jung | H04L 5/0048 |
| 2018/0192412 A1 | 7/2018 | Novlan et al. | |
| 2018/0192443 A1 | 7/2018 | Novlan et al. | |
| 2018/0227950 A1* | 8/2018 | Iwai | H04W 72/02 |
| 2018/0255586 A1 | 9/2018 | Einhaus et al. | |
| 2018/0279380 A1* | 9/2018 | Jung | H04W 74/0833 |
| 2018/0324853 A1* | 11/2018 | Jeon | H04W 74/08 |
| 2018/0338308 A1* | 11/2018 | Park | H04L 5/003 |
| 2018/0343682 A1* | 11/2018 | Tang | H04L 41/08 |
| 2018/0359783 A1 | 12/2018 | Abedini et al. | |
| 2019/0104551 A1* | 4/2019 | Deenoo | H04W 72/0453 |
| 2019/0140735 A1 | 5/2019 | Fox | |
| 2019/0150202 A1* | 5/2019 | Harada | H04W 74/0808 370/329 |
| 2019/0223157 A1 | 7/2019 | Hwang et al. | |
| 2019/0254077 A1 | 8/2019 | Sahlin et al. | |
| 2019/0274172 A1* | 9/2019 | Yoon | H04W 74/0866 |
| 2019/0320355 A1* | 10/2019 | Da Silva | H04W 72/046 |
| 2019/0364492 A1* | 11/2019 | Azizi | H04W 48/16 |
| 2020/0037297 A1 | 1/2020 | Pan et al. | |
| 2020/0045749 A1* | 2/2020 | Jiang | H04W 48/14 |
| 2020/0154484 A1* | 5/2020 | Ohara | H04L 27/2626 |
| 2021/0105820 A1* | 4/2021 | Kim | H04W 74/0891 |

OTHER PUBLICATIONS

International Search Report and Written Opinion—PCT/US2018/032346—ISA/EPO—dated Aug. 16, 2018.

Qualcomm: "Forward Compatibility Considerations on NR Integrated Access and Backhaul," 3GPP Draft; R1-167119, 3rd Generation Partnership Project (3GPP), Mobile Competence Centre; 650, Route Des Lucioles; F-06921 Sophia-Antipolis Cedex; France, Aug. 22, 2016-Aug. 26, 2016, Aug. 13, 2016, XP051142525, 6 pages, Retrieved from the Internet: URL: http://www.3gpp.org/ftp/tsg_ran/WG1_RL1/TSGR1_86/Docs/ [retrieved on Aug. 13, 2016].

NTT Docomo, Inc., "New Radio (NR) Access Technology, TSG RAN WG1", 3GPP TSG RAN meeting #76, RP-171137, West Palm Beach, USA, Jun. 5-8, 2017 (Year: 2017), 118 Pages.

NTT Docomo, Inc., "Study on New Radio Access Technology", 3GPP TSG RAN meeting #74, RP-162201, Vienna, Austria, Dec. 5-8, 2016, (Year: 2016), 148 Pages.

\* cited by examiner

RANDOM ACCESS PROCEDURE IN A WIRELESS BACKHAUL NETWORK

CROSS REFERENCE TO RELATED APPLICATIONS

This application claims priority to U.S. Provisional Patent Application No. 62/692,446, filed on Jun. 29, 2018 entitled "TECHNIQUES AND APPARATUSES FOR RANDOM ACCESS PROCEDURE IN A BACKHAUL NETWORK," and is a continuation-in-part (CIP) of U.S. patent application Ser. No. 15/976,652, filed on May 10, 2018 entitled "TECHNIQUES AND APPARATUSES FOR RANDOM ACCESS PROCEDURE IN A BACKHAUL NETWORK," which claims priority to U.S. Provisional Patent Application No. 62/517,029 filed on Jun. 8, 2017 entitled "TECHNIQUES AND APPARATUSES FOR RANDOM ACCESS PROCEDURE IN A BACKHAUL NETWORK," and U.S. Provisional Patent Application No. 62/547,538 filed on Aug. 18, 2017 entitled "TECHNIQUES AND APPARATUSES FOR RANDOM ACCESS PROCEDURE IN A BACKHAUL NETWORK," which are incorporated by reference herein.

INTRODUCTION

Aspects of the present disclosure generally relate to wireless communication, and more particularly to techniques and apparatuses for a random access procedure in a wireless backhaul network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, Long Term Evolution (LTE), and New Radio (NR).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, by a base station, one or more parameters associated with a target base station, of a plurality of possible target base stations, for initiating a backhaul connection; determining, by the base station, a transmission configuration for a first random access message based at least in part on the one or more parameters associated with the target base station; and transmitting, by the base station, the first random access message using the transmission configuration.

In some aspects, a base station for wireless communication may include a memory and one or more processors configured to determine one or more parameters associated with a target base station, of a plurality of possible target base stations, for initiating a backhaul connection; determine a transmission configuration for a first random access message based at least in part on the one or more parameters associated with the target base station; and transmit the first random access message using the transmission configuration.

In some aspects, a non-transitory computer-readable medium may store one or more instructions for wireless communication. The one or more instructions, when executed by one or more processors of a base station, may cause the one or more processors to determine one or more parameters associated with a target base station, of a plurality of possible target base stations, for initiating a backhaul connection; determine a transmission configuration for a first random access message based at least in part on the one or more parameters associated with the target base station; and transmit the first random access message using the transmission configuration.

In some aspects, an apparatus for wireless communication may include means for determining one or more parameters associated with a target base station, of a plurality of possible target base stations, for initiating a backhaul connection; means for determining a transmission configuration for a first random access message based at least in part on the one or more parameters associated with the target base station; and means for transmitting the first random access message using the transmission configuration.

In some aspects, a method for wireless communication may include determining, by a base station, a response window for receiving a random access response message associated with a target base station for initiating a backhaul connection, wherein the random access response message is associated with a first random access message transmitted by the base station at an earlier time; and searching, by the base station, for the random access response message in the response window.

In some aspects, a base station for wireless communication may include a memory and one or more processors configured to determine a response window for receiving a random access response message associated with a target base station for initiating a backhaul connection, wherein the random access response message is associated with a first random access message transmitted by the base station at an earlier time; and search for the random access response message in the response window.

In some aspects, a non-transitory computer-readable medium may store one or more instructions for wireless communication. The one or more instructions, when executed by one or more processors of a base station, may cause the one or more processors to determine a response window for receiving a random access response message associated with a target base station for initiating a backhaul connection, wherein the random access response message is associated with a first random access message transmitted by the base station at an earlier time; and search for the random access response message in the response window.

In some aspects, an apparatus for wireless communication may include means for determining a response window for receiving a random access response message associated with a target base station for initiating a backhaul connection, wherein the random access response message is associated with a first random access message transmitted by the apparatus at an earlier time; and means for searching for the random access response message in the response window.

In some aspects, a method for wireless communication may include transmitting, by a base station, beam information associated with a set of cells detected by the base station, wherein the beam information is transmitted to a target base station; and receiving, by the base station and based at least in part on transmitting the beam information to the target base station, one or more random access messages, wherein the one or more random access messages are transmitted by one or more other base stations, wherein the one or more other base stations are associated with one or more cells included in the set of cells detected by the base station.

In some aspects, a base station for wireless communication may include a memory and one or more processors configured to transmit beam information associated with a set of cells detected by the base station, wherein the beam information is transmitted to a target base station; and receive, based at least in part on transmitting the beam information to the target base station, one or more random access messages, wherein the one or more random access messages are transmitted by one or more other base stations, wherein the one or more other base stations are associated with one or more cells included in the set of cells detected by the base station.

In some aspects, a non-transitory computer-readable medium may store one or more instructions for wireless communication. The one or more instructions, when executed by one or more processors of a base station, may cause the one or more processors to transmit beam information associated with a set of cells detected by the base station, wherein the beam information is transmitted to a target base station; and receive, based at least in part on transmitting the beam information to the target base station, one or more random access messages, wherein the one or more random access messages are transmitted by one or more other base stations, wherein the one or more other base stations are associated with one or more cells included in the set of cells detected by the base station.

In some aspects, an apparatus for wireless communication may include means for transmitting beam information associated with a set of cells detected by the apparatus, wherein the beam information is transmitted to a target base station; and means for receiving, based at least in part on transmitting the beam information to the target base station, one or more random access messages, wherein the one or more random access messages are transmitted by one or more other base stations, wherein the one or more other base stations are associated with one or more cells included in the set of cells detected by the apparatus.

In some aspects, a method of wireless communication may include determining, by a base station, a transmission configuration for a first random access message based at least in part on one or more parameters associated with a target base station for initiating a backhaul connection, wherein the transmission configuration includes information associated with a physical random access channel (PRACH) resource associated with transmitting the first random access message, wherein the PRACH resource differs from a PRACH resource associated with a transmission of a random access message by a user equipment; and transmitting, by the base station, the first random access message using the transmission configuration.

In some aspects, a base station for wireless communication may include a memory and one or more processors configured to determine a transmission configuration for a first random access message based at least in part on one or more parameters associated with a target base station for initiating a backhaul connection, wherein the transmission configuration includes information associated with a PRACH resource associated with transmitting the first random access message, wherein the PRACH resource differs from a PRACH resource associated with a transmission of a random access message by a user equipment; and transmit the first random access message using the transmission configuration.

In some aspects, a non-transitory computer-readable medium may store one or more instructions for wireless communication. The one or more instructions, when executed by one or more processors of a base station, may cause the one or more processors to determine a transmission configuration for a first random access message based at least in part on one or more parameters associated with a target base station for initiating a backhaul connection, wherein the transmission configuration includes information associated with a PRACH resource associated with transmitting the first random access message, wherein the PRACH resource differs from a PRACH resource associated with a transmission of a random access message by a user equipment; and transmit the first random access message using the transmission configuration.

In some aspects, an apparatus for wireless communication may include means for determining a transmission configuration for a first random access message based at least in part on one or more parameters associated with a target base station for initiating a backhaul connection, wherein the transmission configuration includes information associated with a PRACH resource associated with transmitting the first random access message, wherein the PRACH resource differs from a PRACH resource associated with a transmission of a random access message by a user equipment; and means for transmitting the first random access message using the transmission configuration.

Aspects generally include a method, an apparatus, a base station, a wireless node, a user equipment, a non-transitory computer-readable medium, a computer program product, and a processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
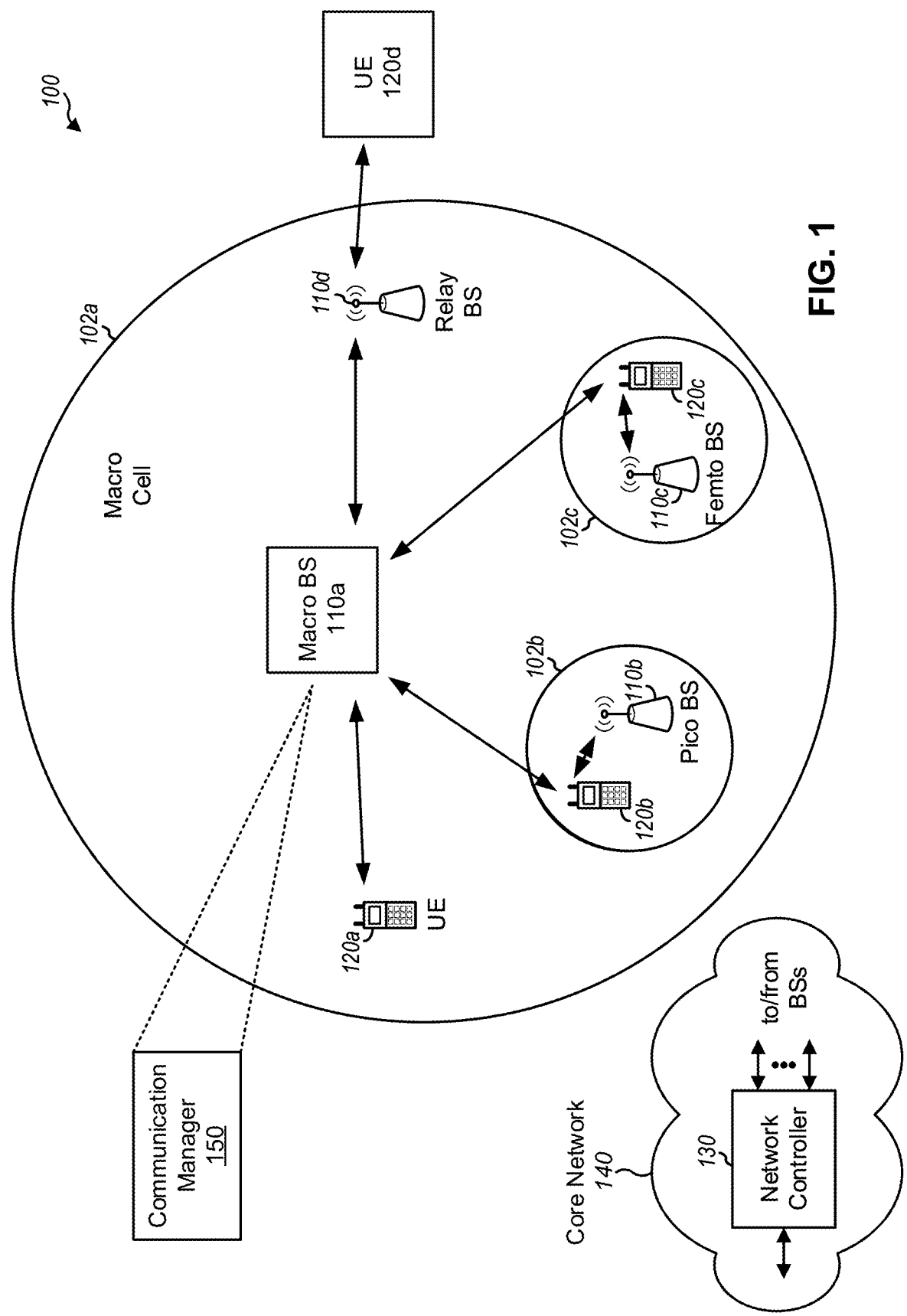
FIG. 1 is a block diagram conceptually illustrating an example of a wireless communication network, in accordance with various aspects of the present disclosure.

A wireless backhaul network may be deployed to provide connectivity to a core network. In a wireless backhaul network, an anchor base station may communicate with the core network via a wired connection (e.g., a fiber connection), and non-anchor base stations may communicate with the anchor base station via wireless links. In some cases, a chain of non-anchor base stations may communicate via wireless links along the chain to form a path to the anchor base station and the core network. Additionally, or alternatively, a single base station may communicate wirelessly with multiple other base stations, forming a mesh network.

A wireless backhaul network may permit simple and low-cost deployment of additional base stations because the base stations may be able to detect one another automatically and be deployed without expensive infrastructure, such as wired connections. Furthermore, network resources (e.g., frequency resources, time resources, and/or the like) may be shared between wireless access links (e.g., between a base station and a UE or between UEs) and wireless backhaul links (e.g., between base stations), thereby enhancing wireless link capacity and reducing network latency. In some cases, the base stations and/or UEs may utilize millimeter waves and/or directional communications (e.g., beamforming, precoding, and/or the like) for the wireless links to reduce inter-link interference.

To support automatic deployment of new base stations, a deployed base station may periodically transmit synchronization communications, such as synchronization blocks including one or more synchronization signals (e.g., a primary synchronization signal (PSS), a secondary synchronization signal (SSS), and/or the like) and/or one or more synchronization channels (e.g., a physical broadcast channel (PBCH), via which a demodulation reference signal (DMRS) and/or other synchronization signals may be transmitted).

A new base station may detect a synchronization communication from a deployed base station, and may use the synchronization communication to determine time synchronization, frequency synchronization, and/or other system information for establishing a wireless connection with the deployed base station using, for example, a random access procedure.

In order to initiate the random access procedure, the new base station may send a first random access message to the deployed base station in order to, for example, inform the target base station of the presence of the new base station, obtain information associated with uplink synchronization, request resources for further transmissions, and/or the like. A deployed base station with which a new base station initiates a random access procedure is herein referred to as a target base station.

However, in some cases, the first random access message may be received by one or more non-target base stations (i.e., one or more base stations with which the new base station is not attempting to establish a connection to the wireless backhaul network), which may cause the one or more non-target base stations to unnecessarily send a random access response message, thereby wasting computing resources, radio resources, and/or complicating establishment of the connection between the new base station and the target base station.

Aspects described herein provide a base station capable of determining a transmission configuration for a first random access message based at least in part on one or more parameters associated with a target base station, and transmitting the first random access message using the transmission configuration. In some aspects, the target base station and/or one or more non-target base stations may identify, based at least in part on the transmission configuration, the target base station as the intended recipient of the first random access message, and may proceed accordingly. For example, the target base station may provide a random access response message, while the one or more non-target base stations may disregard the first random access message. In this way, consumption of computing resources and/or radio resources may be reduced, and establishment of the connection between the new base station and the target base station may be simplified. Additional details are described elsewhere herein.

Aspects described herein further provide a base station capable of determining a response window within which to search for a random access response message, received from a target base station and associated with a first random access message transmitted by the base station, and searching for the random access response message within the response window. In this way, the base station may receive the random access response message in order to continue with a random access procedure associated with establishing a connection with the target base station. Additional details are described elsewhere herein.

Aspects described herein further provide a base station capable of transmitting, to a target base station, beam information, associated with a set of cells detected by the base station (e.g., a set of cells associated with a set of other base stations), and receiving, based at least in part on transmitting the beam information, one or more random access messages from one or more of the set of other base stations. In this way, diversity and/or redundancy of connections, associated with the base station, may be achieved without a need for a random access procedure to be performed in association with the one or more other base stations.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Using the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be a 5G or NR network or some other wireless network, such as an LTE network. Wireless network 100 may include a number of base stations (BSs) 110 (shown as BS 110a, BS 110b, BS 110c, and BS 110d) and other network entities. A BS is an entity that communicates with user equipment (UEs) and/or other BSs, and may also be referred to as a Node B, an eNB, a gNB, a NR BS, a 5G NB, an access point, a transmit receive point (TRP), an access node (AN), and/or the like. Each BS may provide communication coverage for a particular geographic area. In 3GPP, the term "cell" can refer to a coverage area of a BS and/or a BS subsystem serving this coverage area, depending on the context in which the term is used. As used herein, the term "wireless node" may refer to a base station and/or a user equipment.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, a wireless link (e.g., a wireless backhaul link), and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may be implemented in a core network 140.

Core network 140 may include one or more devices to communicate with and/or control BSs 110 and/or one or more devices to route packets through core network 140 to one or more other networks. For example, core network 140 may include a mobility management entity (MME), a serving gateway (SGW), a packet data network (PDN) gateway (PGW), a home subscriber server (HSS), a policy charging and rules function (PCRF) device, an authentication, authorization, and accounting (AAA) server, and/or the like.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) UEs and/or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. MTC UEs, as well as other types of UEs, may be implemented as narrowband internet of things (NB-IoT) devices. UE 120 may be included inside a housing that houses components of UE 120, such as processor components, memory components, and/or the like. As used herein, the term "wireless node" may refer to a BS 110 and/or a UE 120.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

As shown in FIG. 1, base station 110 may include a communication manager 150. As described in more detail elsewhere herein, communication manager 150 may determine one or more parameters associated with a target base station, of a plurality of possible target base stations, for initiating a backhaul connection, may determine a transmission configuration for a first random access message based at least in part on the one or more parameters associated with the target base station, may transmit the first random access message using the transmission configuration, and/or may perform one or more other operations described herein. Communication manager 150 may include one or more components of FIG. 2, as described below. Further, as described in more detail elsewhere herein, communication manager 150 may determine a response window for a receiving a random access response message associated with a target base station for initiating a backhaul connection, wherein the random access response message is associated with a first random access message transmitted by the base station at an earlier time, may search for the random access response message in the response window, and/or may perform one or more other operations described herein.

As indicated above, FIG. 1 is provided as an example. Other examples are possible and may differ from what was described with regard to FIG. 1.

Figure 2:
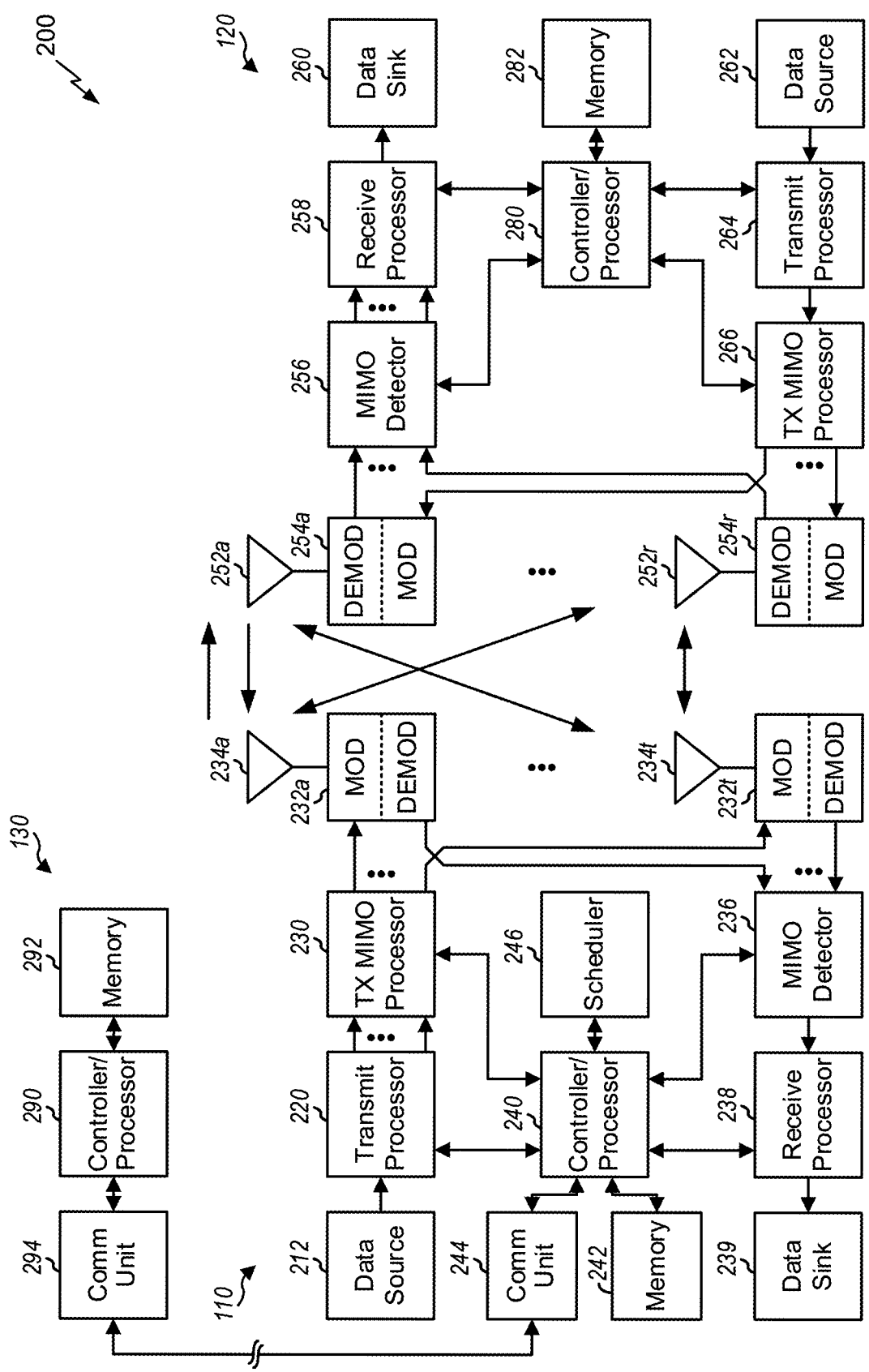
FIG. 2 shows a block diagram conceptually illustrating an example of a base station in communication with a user equipment (UE) in a wireless communication network, in accordance with various aspects of the present disclosure.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., DMRS, CRS, and/or the like) and synchronization signals (e.g., a PSS, an SSS, and/or the like).

A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. Memories 242 and 282 may store data and program codes for base station 110 and UE 120, respectively. A scheduler 246 may schedule UEs for data transmission on the downlink and/or uplink.

In some aspects, one or more components of UE 120 may be included in a housing. Controllers/processors 240 any other component(s) in FIG. 2 may direct the operation at base station 110, respectively, to perform operations associated with random access in a wireless backhaul network, as described in more detail elsewhere herein. For example, controller/processor 240 and/or other processors and modules at base station 110, may perform or direct operations of base station 110 to perform one or more operations associated with random access in a wireless backhaul network. For example, controller/processor 240 and/or other controllers/processors and modules at base station 110 may perform or direct operations of, for example, process 800 of FIG. 8, process 900 of FIG. 9, process 1000 of FIG. 10, and/or other processes described herein. In some aspects, one or more of the components shown in FIG. 2 may be employed to perform example process 800, example process 900, process 1000 of FIG. 10, and/or other processes for the techniques described herein.

Additionally, or alternatively, base station 110 may include means for determining one or more parameters associated with a target base station, of a plurality of possible target base stations, for initiating a backhaul connection, means for determining a transmission configuration for a first random access message based at least in part on the one or more parameters associated with the target base station, means for transmitting the first random access message using the transmission configuration, and/or means for performing other operations described herein.

Additionally, or alternatively, base station 110 may include means for determining a response window for a receiving a random access response message associated with a target base station for initiating a backhaul connection, wherein the random access response message is associated with a first random access message transmitted by the base station at an earlier time, means for searching for the random access response message in the response window, and/or means for performing other operations described herein.

Additionally, or alternatively, base station 110 may include means for transmitting beam information associated with a set of cells detected by the base station, wherein the beam information is transmitted to a target base station; and means for receiving, based at least in part on transmitting the beam information to the target base station, one or more random access messages, wherein the one or more random access messages are transmitted by one or more other base stations, wherein the one or more other base stations are associated with one or more cells included in the set of cells detected by the base station.

Such means may include one or more components shown in FIG. 2. Additionally, or alternatively, communication manager 150 may include one or more components shown in FIG. 2.

As indicated above, FIG. 2 is provided as an example. Other examples are possible and may differ from what was described with regard to FIG. 2.

Figure 3A:
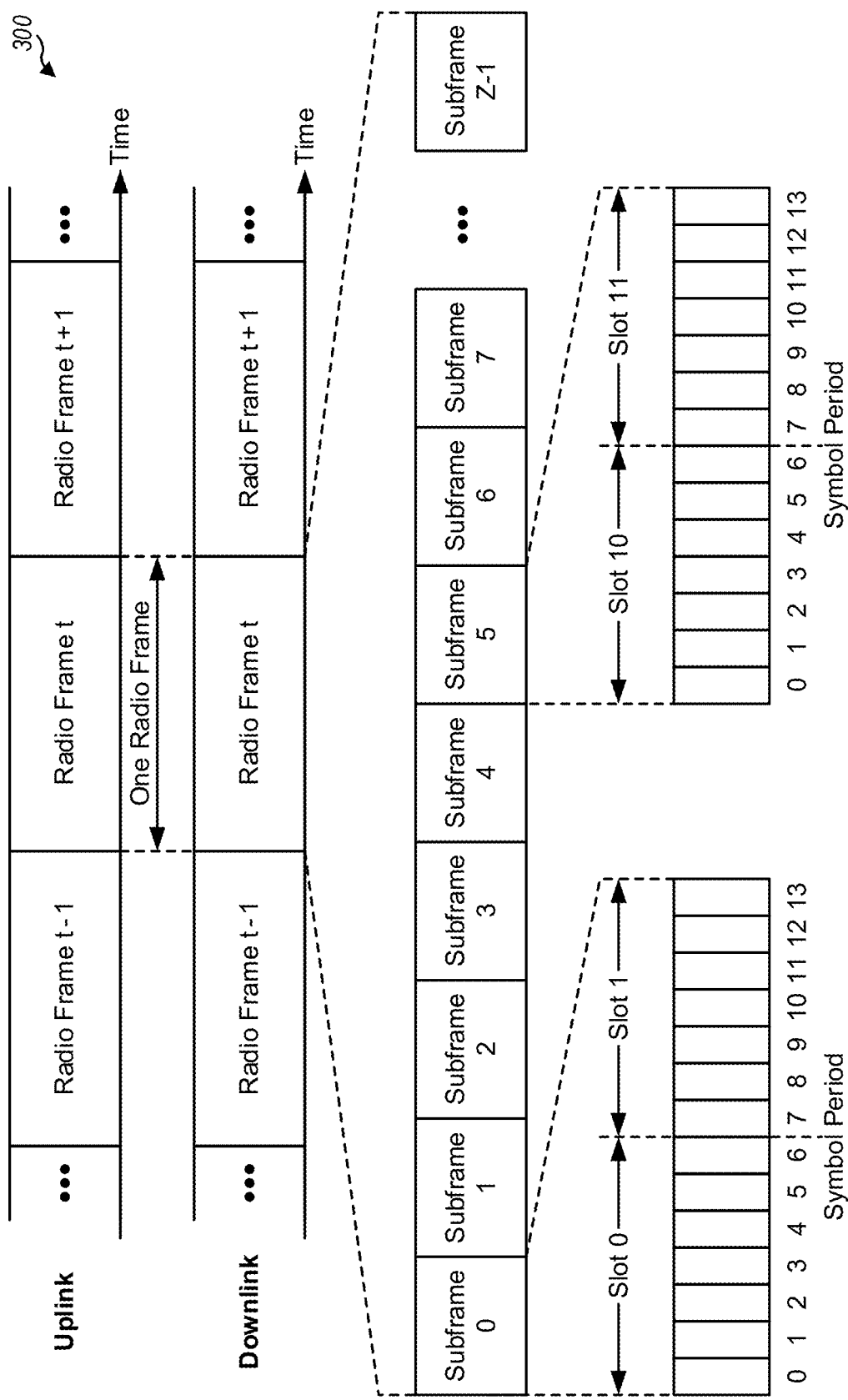
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a BS may transmit synchronization signals. For example, a BS may transmit a primary synchronization signal (PSS), a secondary synchronization signal (SSS), a tertiary synchronization signal (TSS), and/or the like, on the downlink for each cell supported by the BS. The PSS and SSS may be used by UEs for cell search and acquisition, and/or may be used by other BSs for automatic deployment in a wireless backhaul network. For example, the PSS may be used by UEs and/or BSs to determine symbol timing, and the SSS may be used by UEs and/or BSs to determine a physical cell identifier, associated with the BS, and frame timing. The BS may also transmit a physical broadcast channel (PBCH). The PBCH may carry some system information, such as system information that supports initial access by UEs and/or BSs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
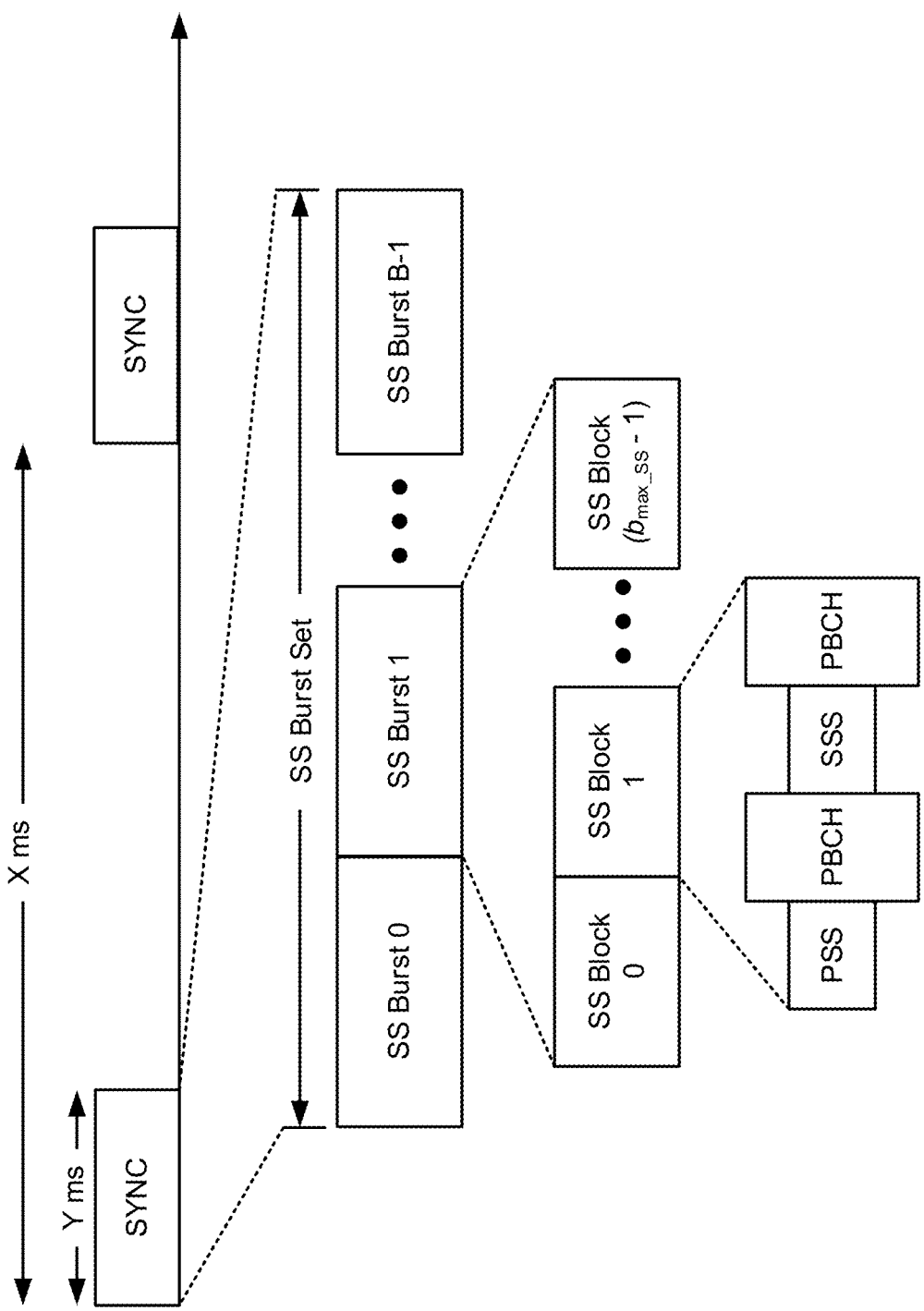
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst. In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a TSS) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the BS according to the burst period. In other words, the SS blocks may be repeated during each SS burst. In some aspects, the SS burst set may have a burst set periodicity, whereby the SS bursts of the SS burst set are transmitted by the BS according to the fixed burst set periodicity. In other words, the SS bursts may be repeated during each SS burst set.

The BS may transmit system information, such as system information blocks (SIBs) on a physical downlink shared channel (PDSCH) in certain subframes. The BS may transmit control information/data on a physical downlink control channel (PDCCH) in B symbol periods of a subframe, where B may be configurable for each subframe. The BS may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
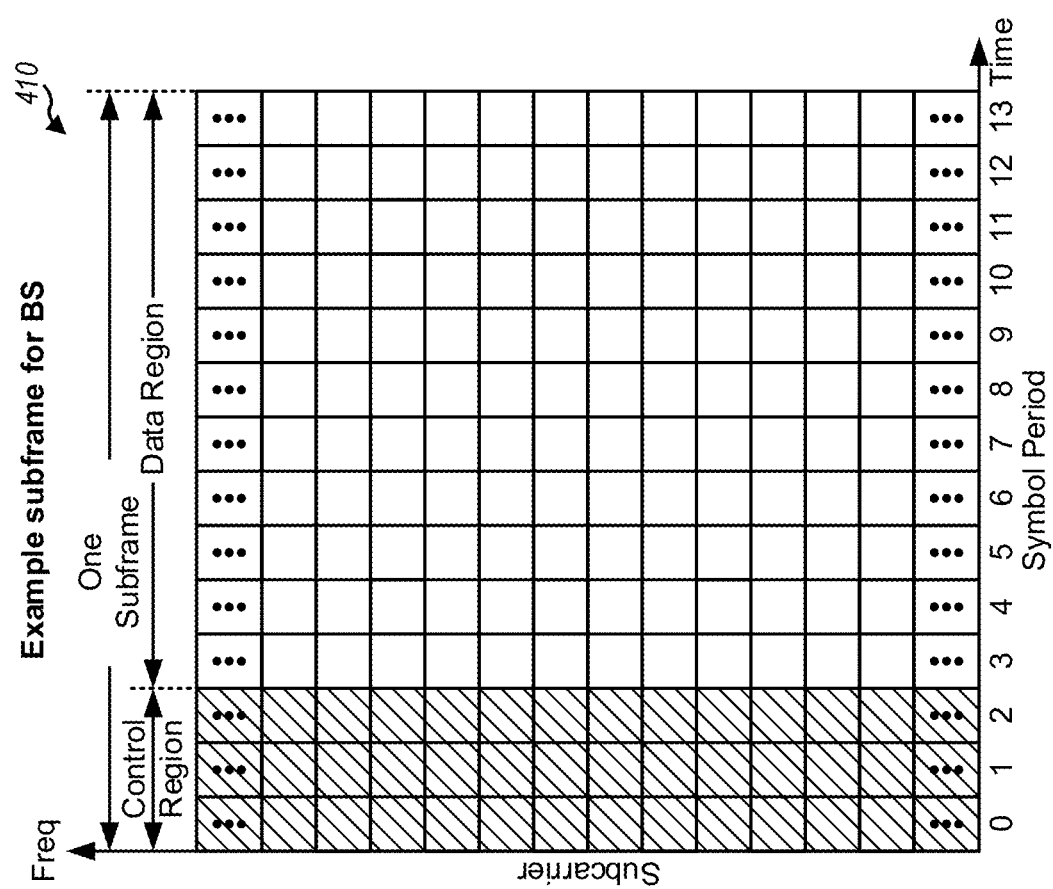
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
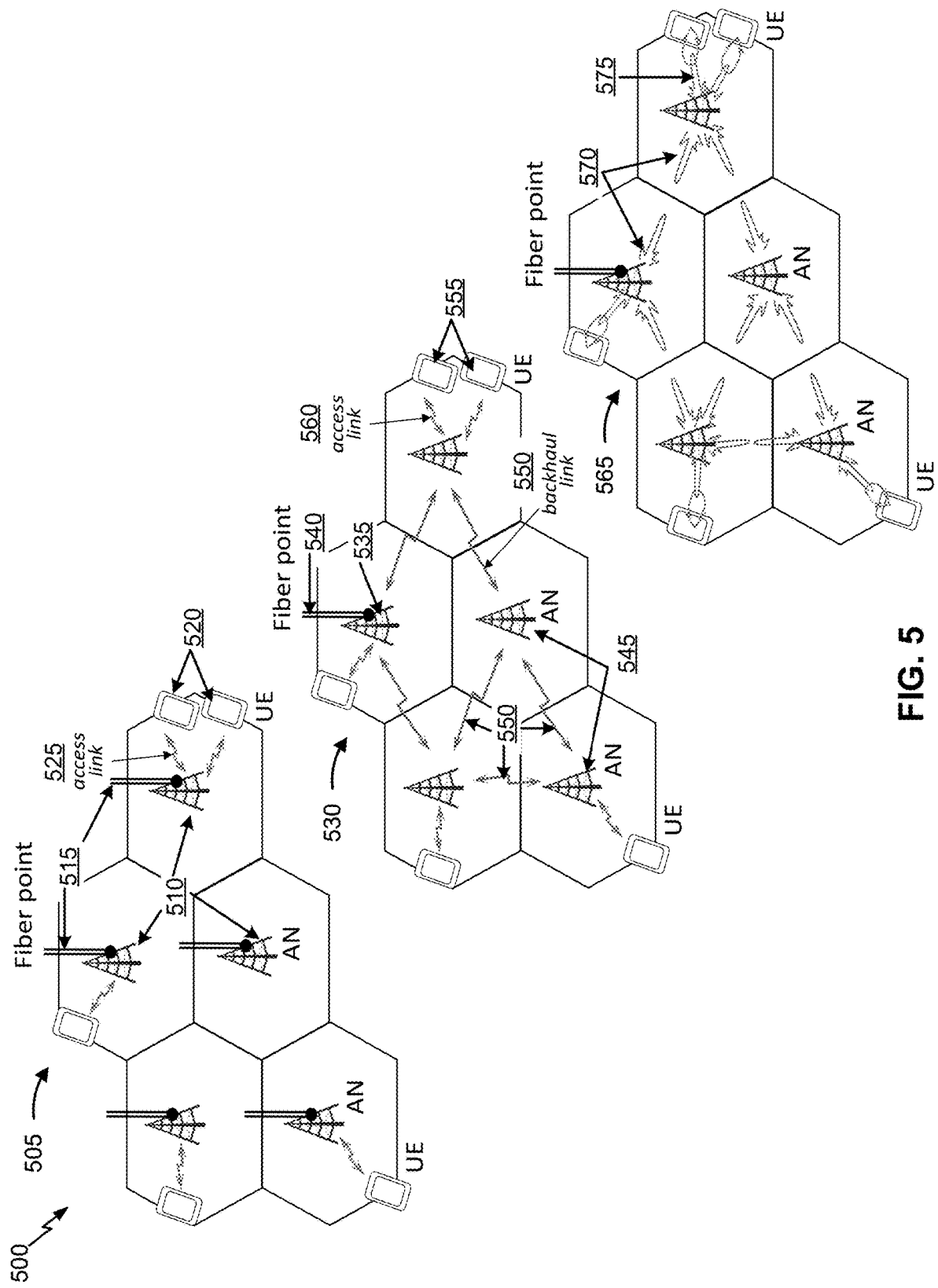
FIG. 5 is a diagram illustrating examples of radio access networks, in accordance with various aspects of the present disclosure.

FIG. 5 is a diagram illustrating examples 500 of radio access networks, in accordance with various aspects of the disclosure.

As shown by reference number 505, a traditional (e.g., 3G, 4G, LTE, etc.) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may correspond to a base station 110 shown in FIG. 1. Similarly, a UE 520 shown in FIG. 5 may correspond to a UE 120 shown in FIG. 1.

As shown by reference number 530, a radio access network may include a wireless backhaul network, where at least one base station is an anchor base station 535 that communicates with a core network via a wired backhaul link 540, such as a fiber connection. The wireless backhaul network may include one or more non-anchor base stations 545 that communicate directly with or indirectly with (e.g., via one or more non-anchor base stations 545) the anchor base station 535 via one or more backhaul links 550 to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may correspond to a base station 110 shown in FIG. 1. Similarly, a UE 555 shown in FIG. 5 may correspond to a UE 120 shown in FIG. 1.

As shown by reference number 565, in some aspects, a radio access network that includes a wireless backhaul network may utilize millimeter wave technology and/or directional communications (e.g., beamforming, precoding, and/or the like) for communications between base stations and/or UEs (e.g., between two base stations, between two UEs, and/or between a base station and a UE). For example, the wireless backhaul links 570 between base stations may use millimeter waves to carry information and/or may be directed toward a target base station using beamforming, precoding, and/or the like. Similarly, the wireless access links 575 between a UE and a base station may use millimeter waves and/or may be directed toward a target wireless node (e.g., a UE and/or a base station). In this way, inter-link interference may be reduced.

As indicated above, FIG. 5 is provided as an example. Other examples are possible and may differ from what was described with regard to FIG. 5.

Figure 6:
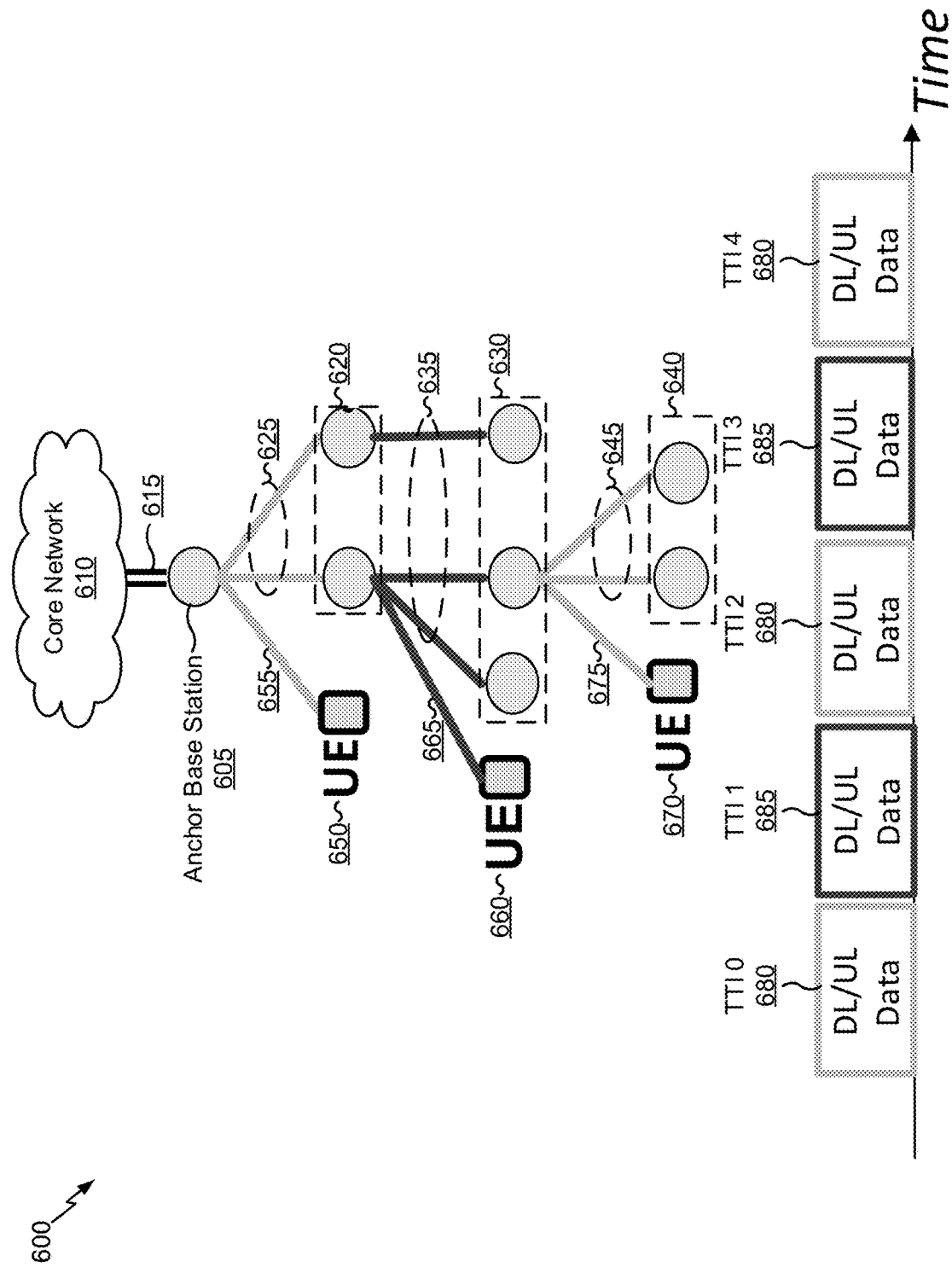
FIG. 6 is a diagram illustrating an example of resource partitioning in a wireless backhaul network, in accordance with various aspects of the present disclosure.

FIG. 6 is a diagram illustrating an example 600 of resource partitioning in a wireless backhaul network, in accordance with various aspects of the disclosure.

As shown in FIG. 6, an anchor base station 605 may be connected to a core network 610 via a wired backhaul link 615, such as a fiber connection. As further shown, non-anchor base stations 620 may communicate directly with anchor base station 605 via wireless backhaul links 625. In some aspects, one or more non-anchor base stations may communicate indirectly with anchor base station 605 via multiple wireless backhaul links (e.g., via one or more other non-anchor base stations). For example, and as shown, a first set of non-anchor base stations 630 may communicate indirectly with anchor base station 605 via a wireless backhaul link 635 and a wireless backhaul link 625. As further shown, a second set of non-anchor base stations 640 may communicate indirectly with anchor base station 605 via a wireless backhaul link 645, a wireless backhaul link 635, and a wireless backhaul link 625.

As further shown, a UE 650 may communicate with anchor base station 605 via a wireless access link 655, a UE 660 may communicate with a non-anchor base station 620 via a wireless access link 665, and a UE 670 may communicate with a non-anchor base station 630 via a wireless access link 675.

In some aspects, an index (e.g., a color index) may be assigned to a wireless link and/or a wireless node (e.g., a base station or a UE). The index may indicate one or more resources allocated to a wireless node for communication via the wireless link. For example, and as shown, a first index 680 may be associated with transmission time intervals (TTIs) 0, 2, and 4, and a second index 685 may be associated with TTIs 1 and 3. As indicated by light gray lines in FIG. 6, the first index 680 may be assigned to wireless backhaul links 625 and 645 and wireless access links 655 and 675. Thus, information may be transmitted over these links during TTIs 0, 2, and 4, and not during TTIs 1 and 3. Similarly, and as indicated by dark gray lines in FIG. 6, the second index 685 may be assigned to wireless backhaul links 635 and wireless access links 665. Thus, information may be transmitted over these links during TTIs 1 and 3, and not during TTIs 0, 2, and 4. In this way, wireless nodes may coordinate communication such that a wireless node is not configured to transmit and receive data at the same time.

While the resources are shown as time resources, additionally, or alternatively, an index may be associated with a frequency resource. Furthermore, the configuration of base stations and UEs in FIG. 6 is shown as an example, and other examples are possible.

As indicated above, FIG. 6 is provided as an example. Other examples are possible and may differ from what was described with regard to FIG. 6.

FIGS. 7A-7D are diagrams illustrating example 700 associated with a random access procedure for a wireless backhaul network, in accordance with various aspects of the present disclosure. In some aspects, new base station 705 and/or a target base station in FIGS. 7A-7D may correspond to base station 110 of FIG. 1. In some aspects, new base station 705 operates with a UE functionality (UEF), and target base station 710 operates with an access node functionality (ANF).

Figure 7A:
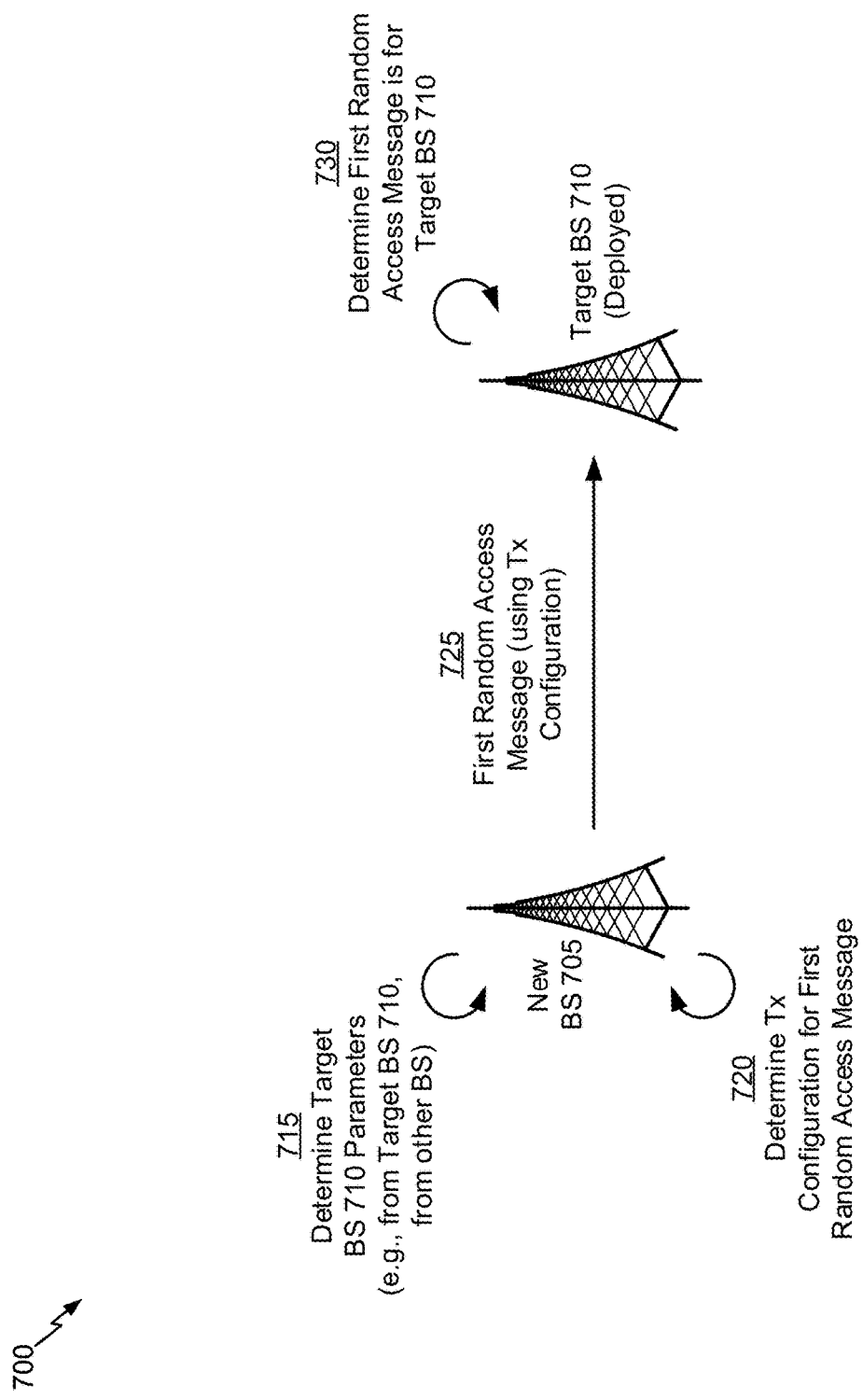
FIGS. 7A-7D are diagrams illustrating examples associated with a random access procedure for a wireless backhaul network, in accordance with various aspects of the present disclosure.

As shown in FIG. 7A, target BS 710 is deployed within a wireless backhaul network, while new BS 705 is a base station that is being deployed in the wireless backhaul network (e.g., a base station that is not yet connected to the wireless backhaul network).

As shown by reference number 715, new BS 705 may determine one or more parameters associated with target BS 710. In some aspects, the one or more parameters, associated with target BS 710, may be used to determine a transmission configuration associated with a first random access message that is to be transmitted to target BS 710, as described below.

In some aspects, the one or more parameters of target BS 710 may include, for example, information that identifies target BS 710, such as a physical cell identifier (PCID).

As another example, the one or more parameters may include state information associated with a state of target BS 710. In some aspects, the state information may include connectivity information associated with target BS 710. The connectivity information may indicate, for example, a state of a connection between target BS 710 and one or more other base stations. For example, the connectivity information may indicate that target BS 710 is connected to at least one other base station via a wireless link, that a threshold amount of time has elapsed since target BS 710 lost a connection with at least one other base station, that a threshold amount of time has not elapsed since target BS 710 lost a connection with at least one other base station, that target BS 710 is not connected to another base station via a wireless link, that target BS 710 is an anchor node that is connected to a core network, and/or the like.

As another example, the state information may include information that identifies a hop count associated with target BS 710 (e.g., a number of hops from target BS 710 to an anchor node that is connected to the core network).

As another example, the state information may include scheduling information associated with target BS 710, such as information that identifies resources (e.g., frequency resources, time resources, and/or the like) via which target BS 710 may transmit and/or receive wireless communications, an index (e.g., a color index) used in association with scheduling communications on one or more wireless links associated with target BS 710, and/or the like.

As another example, the state information may include information that identifies a cluster associated with target BS 710 (e.g., a cluster identifier that identifies a cluster to which target BS 710 belongs). In some aspects, the cluster identifier may be an identifier associated with an anchor node of the cluster.

Additionally, or alternatively, the one or more parameters may include random access information and/or load information associated with target BS 710. The random access information may include, for example, information associated with a random access channel of target BS 710. The load information may include, for example, information associated with load or data demand associated with target BS 710.

In some aspects, the random access information and/or the load information may include one or more price values associated with target BS 710. In some aspects, a price value may be associated with a load of a random access channel associated with target BS 710, a capacity of the random access channel, a data demand associated with target BS 710 and/or the random access channel, a capacity of target BS 710, and/or the like. For example, in some aspects, the price value may indicate a combination of a data demand associated with target BS 710 and a capacity of target BS 710. In some aspects, target BS 710 may be associated with one or more price values (e.g., a set of price values, each corresponding to a different set of access channel resources associated with target BS 710).

Additionally, or alternatively, the one or more parameters may include capability information associated with target base station 710. As a particular example, the capability information may include information associated with a beam correspondence or a beam reciprocity of target base station 710 that, for example, indicates whether target base station 710 is capable of transmitting and receiving beams in a same direction. In some aspects, beam correspondence at target base station 710 may hold if target base station 710 is able to determine a target base station 710 receive beam based at least in part on a measurement by new base station 705 on one or more transmit beams of target base station 710, if target base station 710 is able to determine a target base station 710 transmit beam based at least in part on a measurement by target base station 710 on one or more receive beams of target base station 710, and/or the like.

Additionally, or alternatively, beam correspondence at new base station 705 may hold if new base station 705 is able to determine a new base station 705 transmit beam based at least in part on a measurement by new base station 705 on one or more receive beams of new base station 705, if new base station 705 is able to determine a new base station 705 receive beam based at least in part on an indication by target base station 710, wherein the indication is associated with a measurement on one or more transit beams of new base station 705, and/or the like. In some aspects, an indication of beam correspondence and/or information associated with such beam correspondence may be provided from new base station 705 to target base station 710 and/or from target base station 710 to new base station 705.

In some aspects, for communications that use a wireless backhaul network, subcarrier spacing (SCS) can be differently configured for contention free random access (CFRA) as compared to contention based random access (CBRA). For example, CFRA may be configured use a comparatively larger SCS (e.g., for better timing estimation) in some cases, such as when a common CBRA configuration is used for both access links (e.g., via which UEs may access the network) and backhaul. Thus, in some aspects, the one or more parameters include information that identifies the SCS (i.e., tone spacing) for a random access channel (RACH) transmission by new base station 705, and the SCS for contention free RACH transmissions may be different from a SCS for contention-based RACH transmissions.

In some aspects, a different RACH configuration period can be configured for a wireless backhaul network as compared to an access network. For example, the RACH configuration period for backhaul may be greater than the RACH configuration period for an access link. In some aspects, the RACH configuration period can be configured using one or bits of RMSI. In such a case, RACH resources occur at a longer periodicity in backhaul links as compared to access links. For example, target RACH resources can be configured with 40 ms periodicity for access links, and with 80 ms or 160 ms periodicity for backhaul links.

In some aspects, a RACH sequence format may have the following pattern: CP+P+ . . . +P+GT; where CP, P and GT denote cyclic prefix, preamble and guard time, respectively. Assume a RACH sequence format that has six repetitions has been configured. Here, an access UE (e.g., a UE accessing an NR network) will transmit preamble six repetitive times. However, in some aspects, new base station 705 may be configured to interpret the RACH configuration differently than an access UE (e.g., such that new base station 705 repeats the preamble a comparatively fewer number of times). Typically, round trip time for a backhaul link is greater than that for an access link. Thus, if new base station 705, during performing RACH for a backhaul communication, transmits PRACH with six repetitions, target base station 710 would be required to configure more guard time at the end of the RACH sequence, or not schedule any downlink or uplink communications for a few symbols immediately after the RACH resource. As such, in order to alleviate these restrictions, new base station 705 may be configured to interpret the RACH configuration differently (as compared to an access UE), and transmit PRACH for a shorter duration, accordingly. In other words, in some aspects, the one or more parameters include a preamble length such that new base station 705 is configured to transmit a preamble for a shorter duration as compared to an access UE. In some aspects, the same RACH configuration index may be configured for the access UE and new base station 705, but new base station 705 may be configured to interpret the RACH configuration index differently as compared to the access UE.

In some aspects, the one or more parameters may include a parameter identified by a common random access channel (RACH) configuration information element (e.g., RACH-ConfigCommon, which can be used to specify cell-specific random access parameters in a CBRA system). The parameter of the common RACH configuration information element may include, for example, a parameter that identifies a total number of random access preambles used for contention based and contention-free random access (e.g., totalNumberOfARA-Preambles), excluding preambles used for other purposes. As another example, the parameter of the common RACH configuration information element may include a parameter that identifies a number of SS blocks per RACH occasion and a number of contention based preambles per SS block (e.g., ssb-perRACH-OccasionAndCB-PreamblesPerSSB). As another example, the parameter of the common RACH configuration information element may include a parameter associated with a Group B preamble or a parameter associated with a Group A preamble, such as a transport block size threshold below which to use a contention based random access preamble of Group A (e.g., ra-Msg3 SizeGroupA), a parameter that identifies a threshold for preamble selection (e.g., messagePowerOffsetGroupB), or a parameter that identifies a number of contention based preambles per SS block in Group A (e.g., numberOfRA-PreamblesGroupA), which dictates the number of contention based preambles per SS block available in Group B. As another example, the parameter of the common RACH configuration information element may include a parameter that identifies an initial value for a contention resolution timer (e.g., ra-ContentionResolutionTimer). As another example, the parameter of the common RACH configuration information element may include a parameter associated with a threshold for selecting a SS block and corresponding physical RACH (PRACH) resource for path loss estimation and transmission, such as an initial transmission or a retransmission (e.g., rsrp-ThresholdSSB), or a parameter associated with a threshold for selecting a SS block and corresponding PRACH resource for transmission (e.g., an initial transmission or a retransmission) on a shared uplink (SUL) carrier (e.g., rsrp-TresholdSSB-SUL). As another example, the parameter of the common RACH configuration information element may include a parameter that identifies a PRACH root sequence index (e.g., prach-RootSequenceIndex). As another example, the parameter of the common RACH configuration information element may include a parameter that identifies a subcarrier spacing of a PRACH (e.g., msg1-SubcarrierSpacing). As another example, the parameter of the common RACH configuration information element may include a parameter that identifies a configuration of an unrestricted set of one or two types of restricted sets (e.g., restrictedSetConfig). As another example, the parameter of the common RACH configuration information element may include a parameter that indicates whether transform precoding is enabled for MSG3 transmission (e.g., msg3-transformPrecoding).

In some aspects, the one or more parameters may include a parameter identified by a dedicated RACH configuration information element (e.g., RACH-ConfigDedicated, which can be used to specify dedicated random access parameters in a CFRA system). The parameter of the dedicated RACH configuration information element may include, for example, a parameter associated with identifying resources for contention free random access to a given target cell (e.g., cfra-Resources). For example, the parameter of the dedicated RACH configuration information element may include an identifier associated with a SS block associated with a contention free random access resource and preamble of the given target cell, and/or a preamble index that should be used when performing contention free random access upon selecting a candidate beam identified by the SS block (e.g., ra-PreambleIndex). As another example, the parameter of the dedicated RACH configuration information element may include a parameter that identifies a mask index for random access resource selection (e.g., ra-ssb-OccasionMaskIndex). As another example, the parameter of the dedicated RACH configuration information element may include an identifier associated with a channel state information reference signal (CSI-RS) resource defined in a measurement object associated with the serving cell (e.g., csi-RS), a random access occasion that should be used when performing contention free random access upon selecting a candidate beam identified by the CSI-RS (e.g., ra-OccasionList), and/or a random access preamble index to use in the random access occasions associated with the CSI-RS. As another example, the parameter of the dedicated RACH configuration information element may include a parameter that identifies a threshold associated with the CSI-RS (e.g., cfra-csirs-DedicatedRACH-Threshold).

In some aspects, the one or more parameters may include a parameter identified by a generic RACH configuration information element (e.g., RACH-ConfigGeneric, which can be used to specify parameters for both a CBRA system and a CFRA system). The parameter of the generic RACH configuration information element may include, for example, a parameter that identifies a PRACH index (e.g., prach-ConfigurationIndex). As another example, the parameter of the generic RACH configuration information element may include a parameter that identifies a number of PRACH transmission occasions frequency division multiplexed in one time instance (e.g., msg1-FDM). As another example, the parameter of the generic RACH configuration information element may include a parameter that identifies an offset of a lowest PRACH transmission occasion in the frequency domain with respect to physical resource block 0 (e.g., msg1-FrequencyStart). As another example, the parameter of the generic RACH configuration information element may include a parameter that identifies a cyclic shift (NCS) configuration for a PRACH sequence (e.g., zeroCorrelation-ZoneConfig). As another example, the parameter of the generic RACH configuration information element may include a parameter that identifies a target power level at a network receiver side for a PRACH sequence (e.g., preambleReceivedTargetPower). As another example, the parameter of the generic RACH configuration information element may include a parameter that identifies a maximum number of random access preamble transmissions performed before declaring a failure (e.g., preambleTransMax). As another example, the parameter of the generic RACH configuration information element may include a parameter that identifies power ramping steps for a PRACH (e.g., powerRamping-Step). As another example, the parameter of the generic RACH configuration information element may include a parameter that identifies a random access response (MSG2) window length (e.g., ra-ResponseWindow).

In some aspects, any one or more parameters identified by a given RACH configuration information element (e.g., a common RACH configuration information element, a dedicated RACH configuration information element, a generic RACH configuration information element) can be different between random access transmissions associated with backhaul links as compared to random access transmission associated with access links.

In some aspects, the one or more parameters may be signaled to new BS 705 via a PSS, a SSS, a TSS, a DMRS in a PBCH, a master information block (MIB), a system information block (SIB), remaining minimum system information, other system information, a set of resources for transmission of synchronization signals and/or synchronization channels (e.g., an SS block), a radio resource control (RRC) message, and/or the like.

In some aspects, target BS 710 may signal the one or more parameters to new BS 705. Additionally, or alternatively, another base station (e.g., a base station that is different from target BS 710, a non-target BS 110, another BS 110 connected to the wireless backhaul network, and/or the like) may signal the one or more parameters to new BS 705. Additionally, or alternatively, a device in the core network may signal the one or more parameters to new BS 705. In some aspects, the one or more parameters may be signaled via a fiber connection.

In some aspects, the one or more parameters may be signaled via a frequency band that is different from a frequency band via which new BS 705 may transmit a first random access message. Additionally, or alternatively, the one or more parameters may be signaled via a network that is different from a network associated with transmitting the first random access message. For example, when the wireless backhaul network is associated with a NR network, the one or more parameters may be signaled via an LTE network.

As further shown in FIG. 7A, and by reference number 720, new BS 705 may determine a transmission configuration for a first random access message based at least in part on the one or more parameters associated with target BS 710. The transmission configuration identifies a configuration based at least in part on which new BS 705 may transmit the first random access message. For example, the transmission configuration may identify a number of repetitions associated with transmitting the first random access message (e.g., a number of times that new BS 705 is to transmit the first random access message using different beam formations, in different directions, and/or the like), a sequence associated with transmitting the first random access message (e.g., a Zadoff-Chu root, a cyclic shift, a scrambling sequence, and/or the like), a set of time resources associated with transmitting the first random access message, a set of frequency resources associated with transmitting the first random access message, and/or the like, as described in further detail below.

In some aspects, new BS 705 may determine the transmission configuration based at least in part on one or more of the one or more parameters associated with target BS 710. As a particular example, a mapping scheme may be used to map a PCID, associated with target BS 710, to particular transmission configuration (e.g., a particular a set of resources to be used for transmitting the first random access message). Here, upon identifying the transmission configuration (e.g., the particular set of resources) associated with the first random access message, target BS 710 may determine (e.g., based at least in part on the mapping scheme) that the first random access message is intended for target BS 710. In a similar manner, a mapping scheme may be used to map multiple parameters (e.g., a hop count and an index, a cluster identifier and scheduling information, and/or the like), associated with target BS 710, to a particular transmission configuration.

As another particular example, new BS 705 may determine the transmission configuration based at least in part on a price value associated with target BS 710. For example, if the price value satisfies a threshold (e.g., is greater than or equal to a particular value), then new BS 705 may determine a first transmission configuration. Conversely, if the price value does not satisfy the threshold (e.g., is lower than the particular value), then new BS 705 may determine a second transmission configuration.

In some aspects, new BS 705 may determine the transmission configuration based at least in part on a combination (e.g., an average, a weighted average, a score, and/or the like) associated with one or more of the parameters associated with target BS 710. For example, in some aspects, new BS 705 may determine the transmission configuration based at least in part on a model that receives, as input, one or more parameters associated with target BS 710, and provides, as output, information that identifies the transmission configuration.

Additionally, or alternatively, new BS 705 may determine the transmission configuration based at least in part on transmission configuration information stored or accessible by new BS 705.

The transmission configuration information may include, for example, information that identifies a set of resources (e.g., a set of time resources, a set of frequency resources, and/or the like) to be used for transmitting the first random access message.

In some aspects, the set of resources may be a first set of resources that is to be used for transmissions by base stations, whereas a second (e.g., different) set of resources may be used for transmissions by UEs. In this way, a transmission using a particular set of resources may indicate to target BS 710, that new BS 705 is a base station (e.g., rather than a UE), a capability associated with new BS 705 (e.g., since a capability, such as a tone spacing, a maximum bandwidth, a downlink-to-uplink switching time, a beam correspondence, and/or the like, may differ between base stations and UEs), a configuration for another random access message (e.g., when a configuration for a random access response, to be transmitted by target BS 710, depends on whether the random access response is being transmitted to a base station or a UE), and/or the like.

In some aspects, such as in a contention random access (CBRA) based system, the set of resources may be a first set of resources that is to be used for transmissions by base stations or UEs, whereas a second (e.g., different) set of resources may be used for transmission by UEs. Here, since random access messages may need to be transmitted by base stations on a less frequent basis as compared to transmissions of first random access messages by UEs, the first set of resources may be used for multiplexing CBRA transmissions by base stations and UEs, thereby increasing efficiency in terms of resource usage without impacting UE random access procedures (e.g., since base stations may not use the second set of resources for transmitting random access messages).

In some aspects, the transmission configuration may be determined based at least in part on one or more parameters carried by a RACH configuration information element (e.g., a common RACH configuration information element, a dedicated RACH configuration information element, a generic RACH configuration information element, and/or the like). As such, in some aspects, the transmission configuration may include information associated with a PRACH configuration index associated with transmitting the first random access message. Here, the PRACH configuration index may differ from a PRACH configuration index associated with a transmission of a random access message by a UE. In some aspects, this difference in PRACH configuration indices causes a PRACH resource, associated with the transmitting the first random access message by the base station, to be different from a PRACH resource associated with the transmission of the random access message by the UE.

Similarly, the transmission configuration may include information associated with a starting frequency location associated with transmitting the first random access message. Here, the starting frequency location may differ from a starting frequency location associated with a transmission of a random access message by a UE. Further, the transmission configuration may include information associated with a number of frequency division multiplexed subcarrier regions associated with transmitting the first random access message. Here, the number of frequency division multiplexed subcarrier regions may differ from a number of frequency division multiplexed subcarrier regions associated with a transmission of a random access message by a UE.

In some aspects, the transmission configuration information may include information that identifies a particular power characteristic associated with transmitting the first random access message. In some aspects, the particular power characteristic may differ from a power characteristic associated with a transmission of a random access message by a UE. In this way, different power control techniques may be implemented for transmission of random access messages by base stations as compared to UEs.

In some aspects, the particular power characteristic may be associated with, for example, a maximum transmit power associated with transmitting the first random access message by new BS 705. Here, the maximum transmit power may differ from that associated with a transmission by a UE when, for example, a maximum transmit power needed for a transmission of a random access message by a base station is less than that needed for a transmission of a random access message by a UE. In some aspects, a target receive powetr and/or power ramping configuration, associated with receiving random access messages, may also differ between base stations and UEs.

As another example, the particular power characteristic may be associated with a power ramping counter associated with a retransmission of the first random access message by new BS 705. Here, a power ramping counter policy (e.g., a policy associated with resetting the power ramping counter, incrementing the power ramping counter, not changing the power ramping counter, and/or the like), associated with a retransmission by new BS 705, may differ from a power ramping counter policy associated with a retransmission by a UE. In some aspects, the power ramping counter policy may be associated with one or more possible transmit beams that may be used by new BS 705 (i.e., the power ramping counter policy may be configured on a per-beam basis). As another example, the particular power characteristic may be associated with a beam switching configuration associated with transmitting the first random access message.

In some aspects, the transmission configuration information may include information that identifies a channel format associated with transmitting the first random access message. In some aspects, the particular channel format may differ from a channel format associated with a transmission of a random access message by a UE. In this way, different channel formats may be implemented for transmission of random access messages by base stations as compared to UEs.

In some aspects, the particular channel format may be associated with a length of a cyclic prefix (CP) associated with transmitting the first random access message by new BS 705 (e.g., when a longer CP is needed for transmissions of random access messages by base stations as compared to that needed for transmissions by UEs in order to, for example, accommodate different beam switching times), a bandwidth associated with transmitting the first random access message by new BS 705 (e.g., when a larger bandwidth is needed in order to provide improved timing synchronization between base stations as compared to that associated with UEs), and/or the like.

In some aspects, the transmission configuration information may be signaled to new BS 705 via a MIB, remaining minimum system information, a RRC message, a handover message, and/or the like. In some aspects, the transmission configuration information may be signaled to new BS 705 via a network associated with transmitting the first random access message (e.g., a NR network), a network that is different from a network associated with transmitting the first random access message (e.g., when the wireless backhaul network is associated with a NR network, the transmission configuration information may be signaled via an LTE network), and/or the like.

As further shown in FIG. 7A, and by reference number 725, new BS 705 may transmit the first random access message using the determined transmission configuration.

For example, new BS 705 may transmit the first random access message in accordance with a number of repetitions identified by the transmission configuration, in accordance with a sequence identified by the transmission configuration, in accordance with a set of time resources identified by the transmission configuration, in accordance with a set of frequency resources identified by the transmission configuration, based at least in part on the transmission configuration information associated with new BS 705, and/or the like.

As shown by reference number 730, target BS 710 may receive the first random access message and may determine (e.g., based at least in part on the transmission configuration and/or the one or more parameters associated with target BS 710, in a similar manner to that described above) that the first random access message is intended for target BS 710.

Figure 7B:
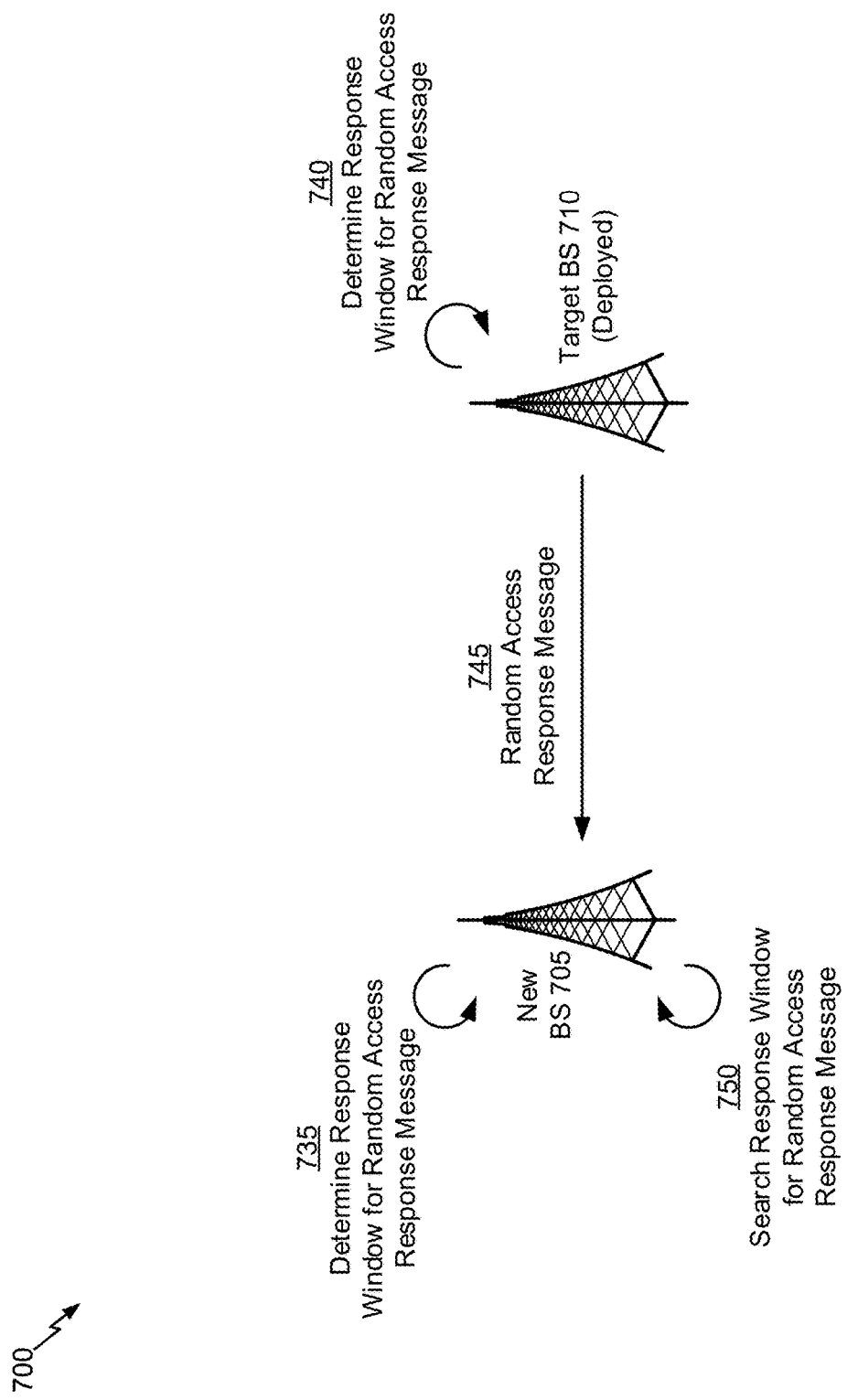

As shown in FIG. 7B, and by reference number 735, new BS 705 may determine a response window for receiving a random access response message (e.g., MSG2) associated with the first random access message. The response window may include information that identifies, for example, a set of time resources and/or a set of frequency resources within which to search for the random access response message associated with the first random access message. In some aspects, new BS 705 may determine the response window based at least in part on determining the transmission configuration and/or transmitting the first random access message (e.g., determination of the transmission configuration and/or transmission of the first random access message may trigger determination of the response window).

In some aspects, new BS 705 may determine the response window based at least in part on the one or more parameters associated with target BS 710. For example, new BS 705 may apply a mapping scheme associated with mapping one or more parameters, associated with target BS 710 (e.g., a PCID, a hop count and an index, and/or the like), to a particular response window, and may determine the response window accordingly. As another example, new BS 705 may determine the response window based at least in part on a model that receives, as input, one or more parameters associated with target BS 710, and provides, as output, information that identifies the response window.

Additionally, or alternatively, new BS 705 may determine the response window based at least in part on resource information associated with the response window (e.g., information that identifies a set of time resources included in the response window, information that identifies a set of frequency resources included in the response window, and/or the like).

In some aspects, the resource information may be (e.g., explicitly) signaled to new BS 705 via a MIB, a SIB, remaining minimum system information, other system information, a RRC message, and/or the like.

In some aspects, target BS 710 may signal the resource information to new BS 705. Additionally, or alternatively, another base station (e.g., a base station that is different from target BS 710, a non-target BS 110, another BS 110 connected to the wireless backhaul network, and/or the like) may signal the resource information to new BS 705. Additionally, or alternatively, another device in the core network may signal the resource information to new BS 705. In some aspects, the resource information may be signaled via a fiber connection. In some aspects, the resource information may be signaled via a frequency band that is different from a frequency band via which new BS 705 may transmit the first random access message or receive the random access response message. Additionally, or alternatively, the resource information may be signaled via a network that is different from a network associated with transmitting the first random access message or receiving the random access response message. For example, when the wireless backhaul network is associated with a NR network, the resource information may be signaled via an LTE network.

As further shown in FIG. 7B, and by reference number 740, after determining that the first random access message is intended for target BS 710, target BS 710 may determine (e.g., based at least in part on the resource information and/or the one or more parameters associated with target BS 710, in a similar manner to that described above) the response window associated with transmitting the random access response. As shown by reference number 745, target BS 710 may transmit the random access response in the response window.

As shown by reference number 750, new BS 705 may search the response window, determined by new BS 705, for the random access response message, and may receive the random access response message based at least in part on searching the determined response window.

In some aspects, new BS 705 and target BS 710 may exchange additional messages associated with the random access procedure (e.g., MSG3, MSG4, and/or the like) after new BS 705 receives the random access response message based at least in part on searching the response window.

For example, new BS 705 may transmit, to target BS 710, another random access message (e.g., a RRC connection request message, MSG3, a L2/L3 message, a connection request message, and/or the like). In some aspects, the other random access message may include beam information associated with a set of cells detected by new BS 705. As a particular example, assume that during initiation of the random access procedure, new BS 705 detects multiple beams: a beam associated with a cell of target BS 710, a beam associated with a deployed BS 711, and a beam associated with a deployed BS 712. Here, as shown in FIG. 7C and by reference number 755, new BS 705 may transmit beam information, associated with the detected cells of BSs 711 and 712, in another random access message to target BS 710.

Figure 7C:
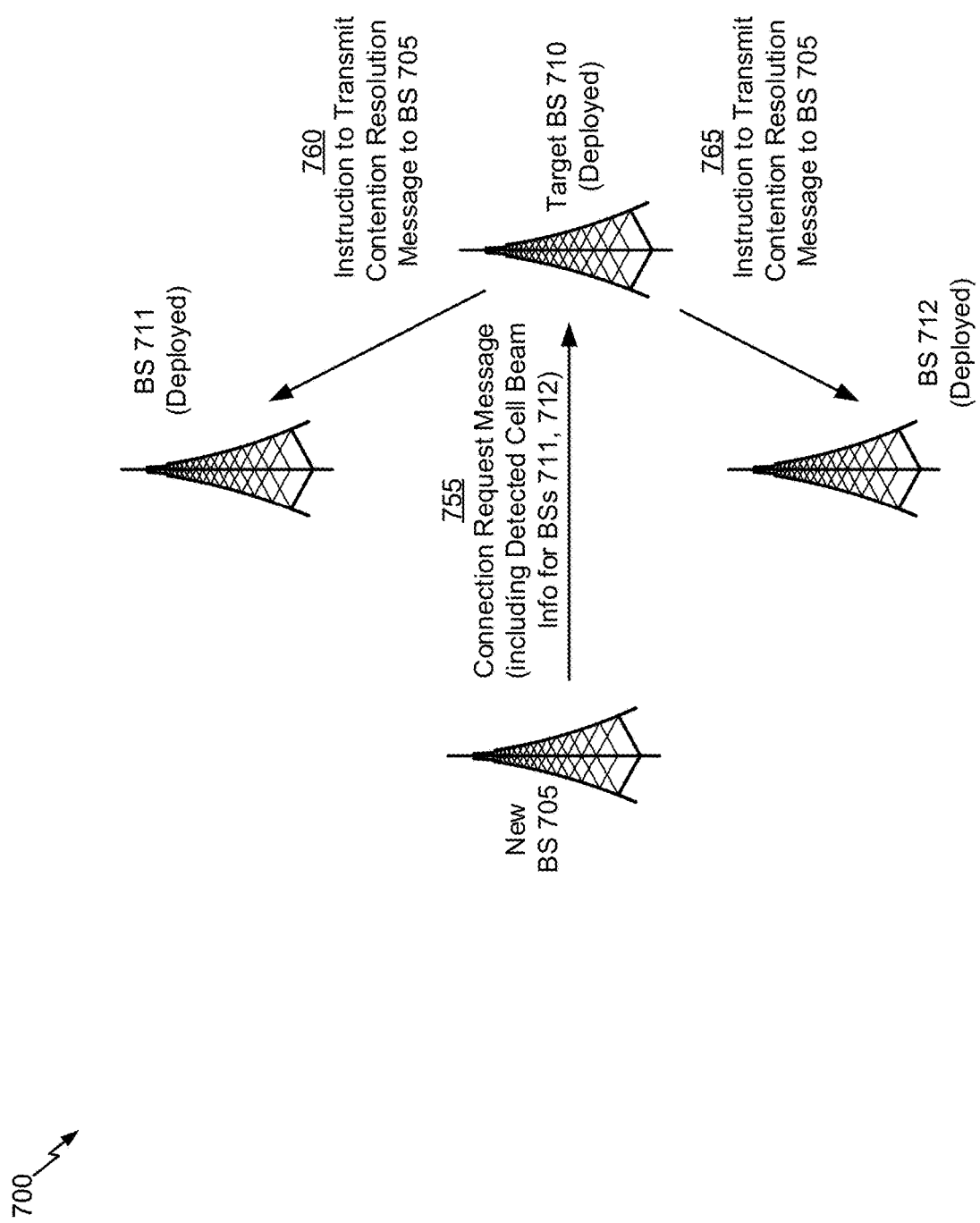

In some aspects, as indicated in FIG. 7C, the beam information may include information that identifies one or more beams associated with one or more other base stations (e.g., other than target base station 710). For example, the beam information may include one or more beam identifiers associated with the one or more beams.

In some aspects, new BS 705 may transmit the beam information in accordance with information provided by target BS 710. For example, target BS 710 may transmit, to new BS 705, information that identifies a number of cells for which beam information is to be transmitted by new BS 705, a type of beam information to be transmitted by new BS 705, a format of beam information to be transmitted by new BS 705, and/or the like. In some aspects, target BS 710 may transmit such information to new BS 705 in a random access message (e.g., the random access response, MSG2, and/or the like).

As further shown in FIG. 7C, and by reference numbers 760 and 765, target BS 710 may receive the beam information transmitted by new BS 705 and may instruct both BS 711 and BS 712 each to transmit another random access message (e.g., a contention resolution message, MSG4, and/or the like) to new BS 705. For example, target BS 710 may identify (e.g., based at least in part on information stored or accessible by target BS 710) BS 711 as being associated with a first beam identified in the beam information, and may identify BS 712 as being associated with a second beam identified in the beam information. Here, target BS 710 may instruct BS 711 and BS 712 each to transmit the other random access message to new BS 705.

In some aspects, target BS 710 may instruct BS 711 and BS 712 to transmit the other random access message to new BS 705, as in the above example. Additionally, or alternatively, the instruction may be provided by another device associated with target BS 710, such as another device in the core network.

Figure 7D:
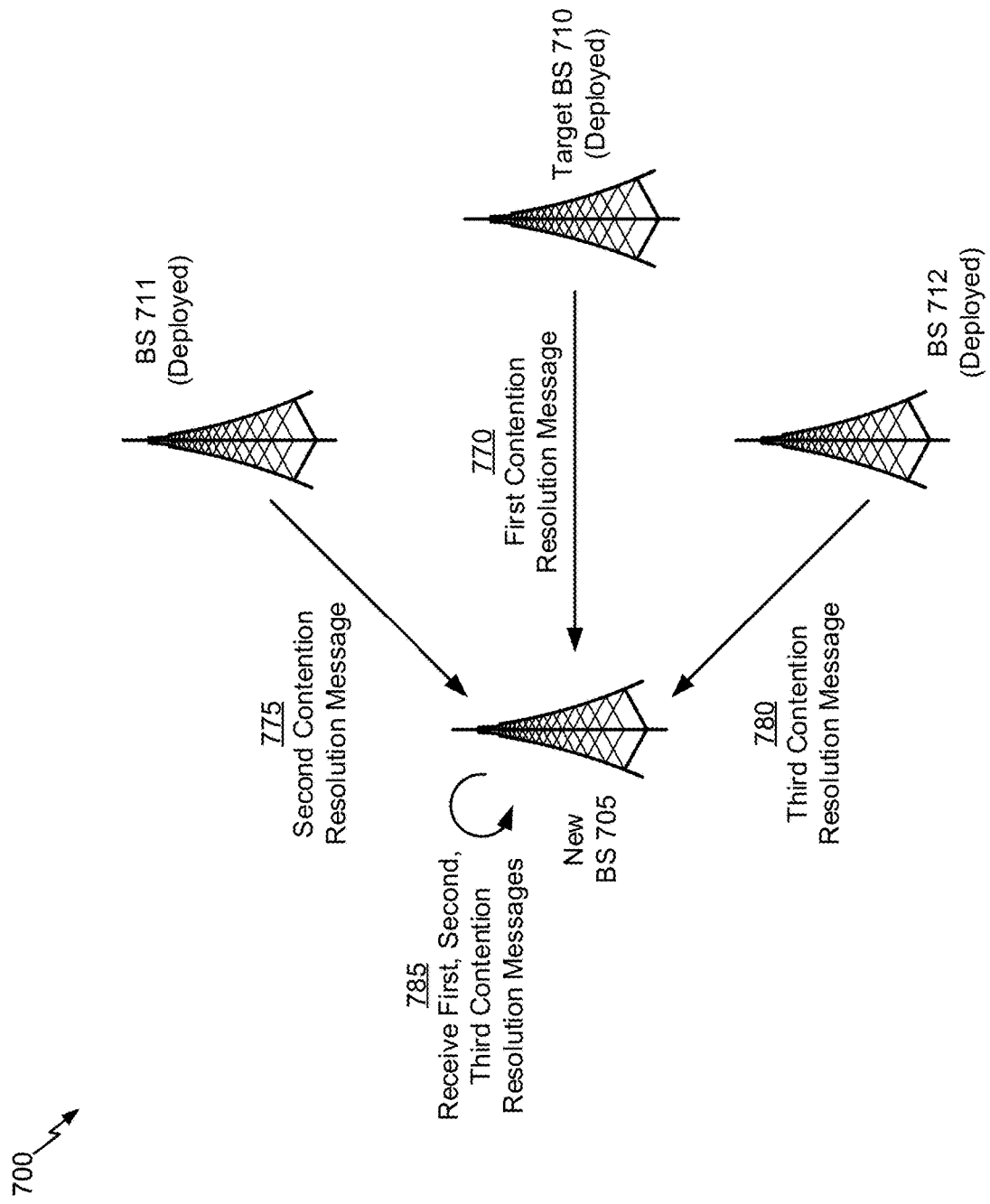

As shown in FIG. 7D, and by reference number 770, target BS 710 may transmit a first other random access message (e.g., a contention resolution message, MSG4, and/or the like), to new BS 705. Similarly, as shown by reference numbers 775 and 780, BS 711 and BS 712 may transmit (e.g., based at least in part on the instruction provided by target BS 710) a second other random access message and a third other random access message, respectively, to new BS 705.

In some aspects, in order to allow new BS 705 to receive each of the first other random access message, the second other random access message, and the third other random access message, periods of time during which these messages may be interleaved (e.g., such that each message is transmitted during a different time period, using a different set of resources, and/or the like) within a particular period of time (e.g., a response window to be searched by new BS 705).

In some aspects, in order to receive the other random access messages, new BS 705 may monitor a set of interleaved time periods, each of which is associated with a different one of the set of detected cells. Here, new BS 705 may monitor each interleaved period of time, and may receive the other random access messages accordingly. For example, new BS 705 may monitor a first interleaved period of time and receive the first other random access message, monitor a second interleaved period of time and receive the second other random access message, and may monitor a third interleaved period of time and receive the third other random access message.

In some aspects, new BS 705 may monitor each interleaved period of time since new BS 705 does not have information indicating which base station(s), associated with the set of detected cells, will transmit other random access message. As such, even when target BS 710 causes only a single other random access message to be transmitted to new BS 705 by a single base station (e.g., by one of target BS 710, BS 711, or BS 712) new BS 705 may still receive the single other random access message.

In some aspects, new BS 705 may monitor a given interleaved period of time using a receive beam corresponding to a detected cell associated with the given interleaved period of time. In some aspects, the receive beams may differ among the set of detected cells. Thus, in some aspects, new BS 705 may switch from using one receive beam, associated with monitoring one period of time, to another receive beam associated with monitoring another period of time, as needed.

Additionally, or alternatively, in order to allow new BS 705 to receive each of the first other random access message, the second other random access message, and the third other random access message, these messages may be transmitted based at least in part on an index (e.g., a color index) used in association with scheduling communications on one or more wireless links, as described above.

As shown by reference number 785, new BS 705 may receive the first other random access message, the second other random access message, and the third other random access message transmitted by target BS 710, BS 711, and BS 712, respectively. In this way, diversity and/or redundancy of connections, associated with new BS 705, may be achieved without a need for a random access procedure to be performed in association with BS 711 and/or BS 712 (e.g., since connections may be established between new BS 705 and BS 711, and between new BS 705 and BS 712 without a need to perform the entire random access procedure).

Notably, FIGS. 7C and 7D are described in the context of new BS 705 transmitting beam information to target BS 710 in a particular type random access message (e.g., a connection request message, MSG3, and/or the like), and receiving another particular type of random access messages associated with a set of detected cells (e.g., one or more contention resolution messages, one or more MSG4s, and/or the like). However, in some aspects, new BS 705 may transmit the beam information in a different type of random access message (e.g., the first random access message, MSG1, and/or the like), and may receive another different type of random access messages associated with the set of detected cells (e.g., one or more random access responses, one or more MSG2s, and/or the like). In this case, new BS 705 may be preconfigured to transmit the beam information, associated with the set of detected cells, in the first random access message.

As indicated above, FIGS. 7A-7D are provided as examples. Other examples are possible and may differ from what was described with regard to FIGS. 7A-7D.

Figure 8:
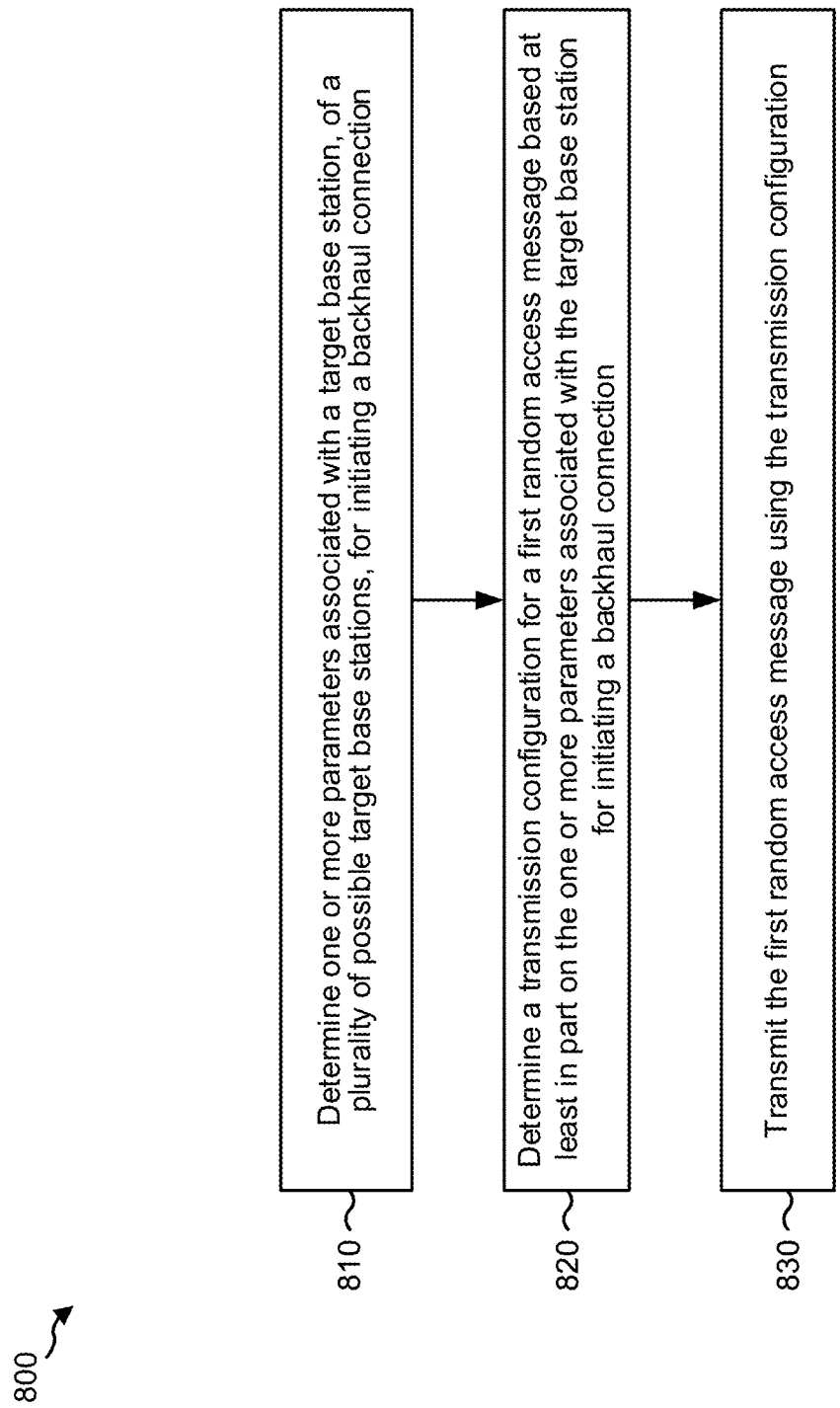
FIG. 8 is a diagram illustrating an example process performed, for example, by a base station, in accordance with various aspects of the present disclosure.

FIG. 8 is a diagram illustrating an example process 800 performed, for example, by a base station (e.g., BS 110, new BS 705), in accordance with various aspects of the present disclosure.

As shown in FIG. 8, in some aspects, process 800 may include determining one or more parameters associated with a target base station, of a plurality of possible target base stations, for initiating a backhaul connection (block 810). For example, a base station may determine one or more parameters associated with a target base station, of a plurality of possible target base stations, for initiating a backhaul connection, as described above.

As further shown in FIG. 8, in some aspects, process 800 may include determining a transmission configuration for a first random access message based at least in part on the one or more parameters associated with the target base station (block 820). For example, the base station may determine a transmission configuration for a first random access message based at least in part on the one or more parameters associated with the target base station, as described above.

As further shown in FIG. 8, in some aspects, process 800 may include transmitting the first random access message using the transmission configuration (block 830). For example, the base station may transmit the first random access message using the transmission configuration, as described above.

Process 800 may include additional aspects, such as any single aspect or any combination of aspects described below and/or in connection with one or more other processes described elsewhere herein.

In some aspects, the base station operates with a UE functionality (UEF) and the target base station operates with an access node functionality (ANF).

In some aspects, the transmission configuration identifies at least one of: a number of repetitions associated with transmitting the first random access message, a sequence associated with transmitting the first random access message, a set of time resources associated with transmitting the first random access message, a set of frequency resources associated with transmitting the first random access message, or some combination thereof.

In some aspects, the one or more parameters, associated with the target base station, include at least one of: an identifier associated with the target base station, state information associated with the target base station, random access information associated with the target base station, load information associated with the target base station, capability information associated with the target base station, or some combination thereof.

In some aspects, the state information includes at least one of: connectivity information associated with the target base station, a hop count associated with the target base station, scheduling information associated with the target base station, an index associated with the target base station, a cluster identifier associated with the target base station, or some combination thereof.

In some aspects, the random access information includes a price value associated with the target base station, wherein the price value is associated with a load of a random access channel, a capacity of the random access channel, or a capacity of the target base station.

In some aspects, the load information includes a price value associated with the target base station, wherein the price value indicates a combination of a data demand, associated with the target base station, and a capacity of the target base station.

In some aspects, the capability information is associated with a beam correspondence capability of the target base station or a beam reciprocity capability of the target base station.

In some aspects, the one or more parameters, associated with the target base station, are signaled to the base station via at least one of: a primary synchronization signal, a secondary synchronization signal, a tertiary synchronization signal, a demodulation reference signal in a physical broadcast channel, a master information block, a system information block, remaining minimum system information, other system information, resources for transmissions of synchronization signals, a radio resource control message, or some combination thereof.

In some aspects, the one or more parameters, associated with the target base station, are signaled to the base station by the target base station.

In some aspects, the one or more parameters, associated with the target base station, are signaled to the base station by a base station that is different from the target base station.

In some aspects, the one or more parameters, associated with the target base station, are signaled via at least one of: a frequency band that is different from a frequency band associated with transmitting the first random access message, or a network that is different from a network associated with transmitting the first random access message. In some aspects, the network via which the one or more parameters are signaled is a long term evolution (LTE) network.

In some aspects, the base station may determine a response window for a receiving a random access response message, and may search for the random access response message in the response window. In some aspects, the response window is determined based at least in part on the one or more parameters associated with the target base station.

In some aspects, the response window is determined based at least in part on resource information signaled in at least one of: a master information block, a system information block, remaining minimum system information, other system information, a radio resource control message, or some combination thereof.

In some aspects, the resource information is signaled by the target base station.

In some aspects, the resource information is signaled by a base station that is different from the target base station.

In some aspects, the resource information is signaled via at least one of: a frequency band that is different from a frequency band associated with transmitting the first random access message, or a network that is different from a network associated with transmitting the first random access message. In some aspects, the network via which the resource information is signaled is a long term evolution (LTE) network.

In some aspects, the one or more parameters, associated with the target base station, are signaled to the base station by a device in a core network. In some aspects, the one or more parameters are signaled via a fiber connection.

In some aspects, the resource information is signaled to the base station by a device in a core network. In some aspects, the resource information is signaled via a fiber connection.

In some aspects, the transmission configuration identifies a particular set of resources to be used for a random access channel transmission by the base station, wherein the first random access message is transmitted using the particular set of resources, and wherein another set of resources is to be used for a transmission by a user equipment, wherein the other set of resources is different from the particular set of resources.

In some aspects, the first random access message being transmitted using the particular set of resources indicates at least one of: a classification of the base station as a base station, a capability of the base station, or a configuration for another random access message.

In some aspects, the first random access message being transmitted using the particular set of resources relates to at least one of: a tone spacing, a maximum bandwidth, a downlink-to-uplink switching time, or a beam correspondence.

In some aspects, information associated with the transmission configuration for the first random access message is received by the base station via at least one of: a master information block, remaining minimum system information, or a radio resource control message.

In some aspects, information associated with the transmission configuration for the first random access message is received by the base station via at least one of: a long term evolution (LTE) network, or a new radio (NR) network.

In some aspects, the transmission configuration identifies a particular set of resources, wherein the particular set of resources is to be used for a transmission by the base station or for a transmission by a user equipment, and wherein the first random access message is transmitted using the particular set of resources.

In some aspects, the particular set of resources is a set of resources used for contention based random access transmissions.

In some aspects, the transmission configuration identifies a particular set of resources, wherein the particular set of resources is to be used for a transmission by the base station only, and wherein the first random access message is transmitted using the particular set of resources.

In some aspects, the transmission configuration identifies a particular power characteristic associated with transmitting the first random access message by the base station.

In some aspects, the particular power characteristic is associated with at least one of: a maximum transmit power associated with transmitting the first random access message, a power ramping counter associated with a retransmission of the first random access message, or a beam switching configuration associated with transmitting the first random access message.

In some aspects, the particular power characteristic, associated with the base station, is different from a power characteristic associated with a transmission by a user equipment.

In some aspects, the transmission configuration includes information associated with at least one of: a physical random access channel (PRACH) resource associated with transmitting the first random access message by the base station, wherein the PRACH resource differs from a PRACH resource associated with a transmission of a random access message by a user equipment; a starting frequency location associated with transmitting the first random access message by the base station, wherein the starting frequency location differs from a starting frequency location associated with a transmission of a random access message by a user equipment; or a number of frequency division multiplexed subcarrier regions associated with transmitting the first random access message by the base station, wherein the number of frequency division multiplexed subcarrier regions differ from a number of frequency division multiplexed subcarrier regions associated with a transmission of a random access message by a user equipment.

In some aspects, the transmission configuration includes information associated with a particular PRACH format associated with transmitting the first random access message by the base station, wherein the particular PRACH format differs from a PRACH format associated with a transmission of a random access message by a user equipment.

In some aspects, the base station determines the PRACH resource based at least in part on a configured PRACH configuration index.

In some aspects, the one or more parameters include a set of parameters identified by a common random access channel (RACH) configuration information element, wherein at least one of the set of parameters is different between random access transmissions associated with backhaul links as compared to random access transmission associated with access links.

In some aspects, the one or more parameters include a set of parameters identified by a dedicated RACH configuration information element, wherein at least one of the set of parameters is different between random access transmissions associated with backhaul links as compared to random access transmission associated with access links.

In some aspects, the one or more parameters include a set of parameters identified by a generic RACH configuration information element, wherein at least one of the set of parameters is different between random access transmissions associated with backhaul links as compared to random access transmission associated with access links.

In some aspects, the transmission configuration identifies a particular channel format associated with transmitting the first random access message by the base station.

In some aspects, the particular channel format is associated with at least one of: a length of a cyclic prefix associated with transmitting the first random access message, or a bandwidth associated with transmitting the first random access message.

In some aspects, the particular channel format, associated with the base station, is different from a channel format associated with a transmission by a user equipment.

In some aspects, beam information, associated with a set of detected cells, is transmitted by the base station.

In some aspects, the beam information is transmitted via MSG1 or MSG3.

In some aspects, the beam information includes a set of beam identifiers associated with the set of detected cells.

In some aspects, a random access response is received from the target base station, and wherein the beam information is transmitted in another random access message.

In some aspects, information that identifies a number of detected cells, for which beam information is to be transmitted by the base station, is received from the target base station via a master information block, remaining minimum system information, a random access response, or a handover message.

In some aspects, another set of random access messages is received based at least in part on the beam information being transmitted by the base station, wherein the other set of random access messages is received from a set of base stations associated with the set of detected cells.

In some aspects, the other set of random access messages includes one or more MSG2s or one or more MSG4s.

In some aspects, the other set of random access messages includes at least two random access messages, wherein each of the at least two random access messages is received during a different one of a set of interleaved periods of time.

In some aspects, the other set of random access messages includes a single random access message, wherein the single random access message is received during one of set of interleaved periods of time.

In some aspects, the set of other random access messages is received based at least in part on monitoring a set of interleaved periods of time associated with receiving random access messages, wherein each of the set of interleaved periods of time is associated with a different cell of the set of detected cells.

In some aspects, each interleaved period of time is monitored using a receive beam included in a set of receive beams, wherein each receive beam, of the set of receive beams, is associated with a different cell of the set of detected cells.

In some aspects, random access messages, included in the other set of random access messages, are received based at least in part on an index.

In some aspects, the one or more parameters include tone spacing for a random access channel (RACH) transmission by the base station, wherein the tone spacing for contention free RACH transmissions is different from a tone spacing for contention based RACH transmissions.

In some aspects, the one or more parameters include a random access channel (RACH) configuration period, wherein the duration of the RACH configuration period is greater for the base station as compared to an access UE.

In some aspects, the one or more parameters include a preamble length, wherein the base station is configured to transmit a preamble for a shorter duration as compared to an access UE. In some aspects, a same random access channel (RACH) configuration index is configured for the access UE and the base station, wherein the base station is configured to interpret the RACH configuration index differently as compared to the access UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
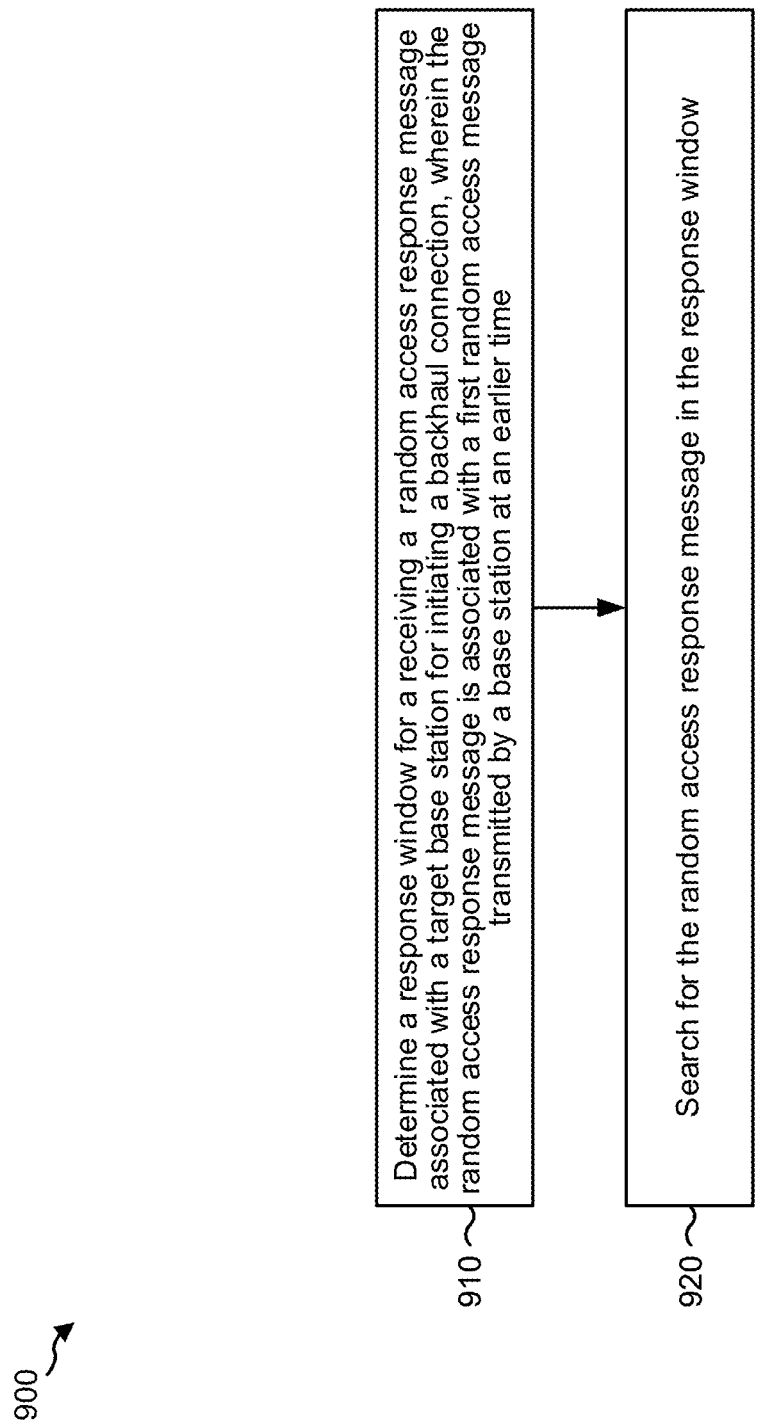
FIG. 9 is a diagram illustrating an example process performed, for example, by a base station, in accordance with various aspects of the present disclosure.

FIG. 9 is a diagram illustrating an example process 900 performed, for example, by a base station (e.g., BS 110, new BS 705), in accordance with various aspects of the present disclosure.

As shown in FIG. 9, in some aspects, process 900 may include determining, by a base station, a response window for a receiving a random access response message associated with a target base station for initiating a backhaul connection, wherein the random access response message is associated with a first random access message transmitted by the base station at an earlier time (block 910). For example, the base station may determine a response window for a receiving a random access response message associated with a target base station for initiating a backhaul connection, wherein the random access response message is associated with a first random access message transmitted by the base station at an earlier time, as described above.

As further shown in FIG. 9, in some aspects, process 900 may include searching for the random access response message in the response window (block 920). For example, the base station may search for the random access response message in the response window, as described above.

Process 900 may include additional aspects, such as any single aspect or any combination of aspects described below and/or in connection with one or more other processes described elsewhere herein.

In some aspects, the response window is determined based at least in part on at least one of: resource information associated with the target base station, one or more parameters associated with the target base station, or some combination thereof.

In some aspects, the resource information is signaled in at least one of: a master information block, a system information block, remaining minimum system information, other system information, a radio resource control message, or some combination thereof.

In some aspects, the resource information is signaled by the target base station.

In some aspects, the resource information is signaled by a base station that is different from the target base station.

In some aspects, the resource information is signaled via at least one of: a frequency band that is different from a frequency band associated with transmitting the first random access message, or a network that is different from a network associated with transmitting the first random access message. In some aspects, the network via which the resource information is signaled is a long term evolution (LTE) network.

In some aspects, the one or more parameters, associated with the target base station, include at least one of: an identifier associated with the target base station, state information associated with the target base station, random access information associated with the target base station, load information associated with the target base station, capability information associated with the target base station, or some combination thereof.

In some aspects, the state information includes at least one of: connectivity information associated with the target base station, a hop count associated with the target base station, scheduling information associated with the target base station, an index associated with the target base station, a cluster identifier associated with the target base station, or some combination thereof.

In some aspects, the random access information includes a price value associated with the target base station, wherein the price value is associated with a load of a random access channel, a capacity of the random access channel, or a capacity of the target base station.

In some aspects, the load information includes a price value associated with the target base station, wherein the price value indicates a combination of a data demand, associated with the target base station, and a capacity of the target base station.

In some aspects, the capability information is associated with a beam correspondence capability of the target base station or a beam reciprocity capability of the target base station.

In some aspects, the one or more parameters, associated with the target base station, are signaled to the base station via at least one of: a primary synchronization signal, a secondary synchronization signal, a demodulation reference signal in a physical broadcast channel, a master information block, a system information block, minimum system information, resources for transmissions of synchronization signals, a radio resource control message, or some combination thereof.

In some aspects, the one or more parameters, associated with the target base station, are signaled to the base station by the target base station.

In some aspects, the one or more parameters, associated with the target base station, are signaled to the base station by a base station that is different from the target base station.

In some aspects, the one or more parameters, associated with the target base station, are signaled via at least one of: a frequency band that is different from a frequency band associated with transmitting the first random access message, or a network that is different from a network associated with transmitting the first random access message. In some aspects, the network via which the one or more parameters are signaled is a long term evolution (LTE) network.

In some aspects, the one or more parameters, associated with the target base station, are signaled to the base station by a device in a core network. In some aspects, the one or more parameters are signaled via a fiber connection.

In some aspects, the resource information is signaled to the base station by a device in a core network. In some aspects, the resource information is signaled via a fiber connection.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
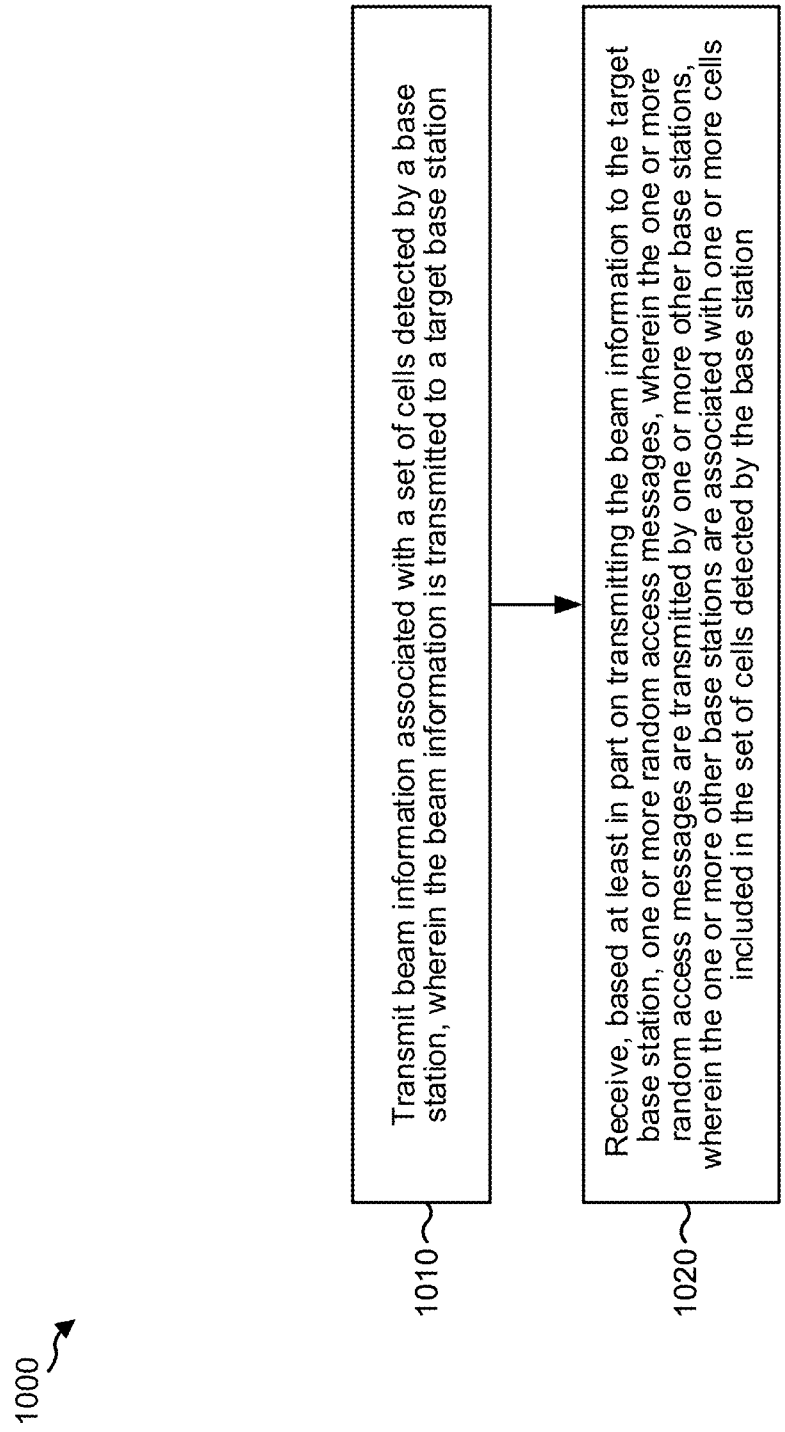
FIG. 10 is a diagram illustrating an example process performed, for example, by a base station, in accordance with various aspects of the present disclosure.

FIG. 10 is a diagram illustrating an example process 1000 performed, for example, by a base station (e.g., BS 110, new BS 705), in accordance with various aspects of the present disclosure.

As shown in FIG. 10, in some aspects, process 1000 may include transmitting beam information associated with a set of cells detected by the base station, wherein the beam information is transmitted to a target base station (block 1010). For example, the base station may include transmit beam information associated with a set of cells detected by the base station, wherein the beam information is transmitted to a target base station, as described above.

As further shown in FIG. 10, in some aspects, process 1000 may include receiving, based at least in part on transmitting the beam information to the target base station, one or more random access messages, wherein the one or more random access messages are transmitted by one or more other base stations, wherein the one or more other base stations are associated with one or more cells included in the set of cells detected by the base station (block 1020). For example, the base station may receive, based at least in part on transmitting the beam information to the target base station, the one or more random access messages, as described above.

Process 1000 may include additional aspects, such as any single aspect or any combination of aspects described below and/or in connection with one or more other processes described elsewhere herein.

In some aspects, the beam information is transmitted to the target base station in another random access message.

In some aspects, the other random access message is MSG1 or MSG3.

In some aspects, the one or more random access messages are one or more MSG2s or one or more MSG4s.

In some aspects, the beam information includes a set of beam identifiers associated with the set of cells.

In some aspects, a random access response is received from the target base station, and wherein the beam information is transmitted in another random access message.

In some aspects, information that identifies a number of cells, for which beam information is to be transmitted by the base station, is received from the target base station.

In some aspects, the one or more random access messages includes at least two random access messages, wherein each of the at least two random access messages is received during a different one of a set of interleaved periods of time associated with receiving random access messages.

In some aspects, the one or more random access messages includes a single random access message, wherein the single random access message is received during one of set of interleaved periods of time associated with receiving random access messages. Here, random access message may denote MSG2 or a random access response; which may provide scheduling information associated with a first uplink transmission after MSG2.

In some aspects, the one or more random access messages are received based at least in part on monitoring a set of interleaved periods of time associated with receiving random access messages, wherein each of the set of interleaved periods of time is associated with a different cell of the set of detected cells.

In some aspects, each interleaved period of time is monitored using a receive beam included in a set of receive beams, wherein each receive beam, of the set of receive beams, is associated with a different cell of the set of detected cells.

In some aspects, the one or more random access messages are received based at least in part on an index.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication, comprising:
   determining, by a base station, a transmission configuration for a first random access message based at least in part on a plurality of parameters associated with a target base station for initiating a backhaul connection,
   wherein the transmission configuration includes information associated with a physical random access channel (PRACH) resource associated with transmitting the first random access message,
   wherein the PRACH resource differs from a PRACH resource associated with a transmission of a random access message by a user equipment,
   wherein the transmission configuration identifies a set of time resources associated with transmitting the first random access message, and wherein the plurality of parameters includes:
a parameter that identifies a number of synchronization signal (SS) blocks per random access channel (RACH) occasion and a number of contention based preambles per SS block;
a parameter associated with a threshold for selecting a SS block and corresponding PRACH resource for path-loss estimation and transmission;
a parameter associated with a threshold for selecting a SS block and corresponding PRACH resource for transmission on a shared uplink carrier;
a parameter that identifies a PRACH root sequence index;
a parameter that identifies a subcarrier spacing of a PRACH;
a parameter that identifies a configuration of an unrestricted set; and
a parameter that indicates whether transform precoding for MSG3 is enabled; and
transmitting, by the base station, the first random access message using the transmission configuration.

2. The method of claim 1, further comprising:
determining the PRACH resource based at least in part on a configured PRACH configuration index.

3. The method of claim 1, wherein the transmission configuration includes information associated with a starting frequency location associated with transmitting the first random access message by the base station,
wherein the starting frequency location differs from a starting frequency location associated with a transmission of a random access message by a user equipment.

4. The method of claim 1, wherein the transmission configuration includes information associated with a number of frequency division multiplexed subcarrier regions associated with transmitting the first random access message by the base station,
wherein the number of frequency division multiplexed subcarrier regions differs from a number of frequency division multiplexed subcarrier regions associated with a transmission of a random access message by a user equipment.

5. The method of claim 1, wherein the transmission configuration includes information associated with a particular PRACH format associated with transmitting the first random access message by the base station,
wherein the particular PRACH format differs from a PRACH format associated with a transmission of a random access message by a user equipment.

6. The method of claim 1, wherein the plurality of parameters includes a set of parameters identified by a common random access channel (RACH) configuration information element,
wherein at least one of the set of parameters is different between random access transmissions associated with backhaul links as compared to random access transmission associated with access links.

7. The method of claim 1, wherein the plurality of parameters includes a set of parameters identified by a dedicated RACH configuration information element, wherein at least one of the set of parameters is different between random access transmissions associated with backhaul links as compared to random access transmission associated with access links.

8. The method of claim 7, wherein the set of parameters includes at least one of:
a parameter associated with identifying resources for contention free random access to a given target cell;
an identifier associated with a SS block associated with a contention free random access resource and a preamble of the given target cell;
a preamble index to be used when performing contention free random access upon selecting a candidate beam identified by the SS block;
a parameter that identifies a mask index for random access resource selection;
an identifier associated with a channel state information reference signal (CSI-RS) resource defined in a measurement object associated with a serving cell;
information that identifies a random access occasion to be used when performing contention free random access upon selecting a candidate beam identified by the CSI-RS;
a random access preamble index to use in random access occasions associated with the CSI-RS; or
a parameter that identifies a threshold associated with the CSI-RS.

9. The method of claim 1, wherein the plurality of parameters includes a set of parameters identified by a generic RACH configuration information element,
wherein at least one of the set of parameters is different between random access transmissions associated with backhaul links as compared to random access transmission associated with access links.

10. The method of claim 9, wherein the set of parameters includes at least one of:
a parameter that identifies a PRACH index;
a parameter that identifies a number of PRACH transmission occasions frequency division multiplexed in one time instance;
a parameter that identifies an offset of a lowest PRACH transmission occasion in a frequency domain with respect to physical resource block 0;
a parameter that identifies a cyclic shift configuration for a PRACH sequence;
a parameter that identifies a target power level for a PRACH sequence;
a parameter that identifies a maximum number of random access preamble transmissions performed before declaring a failure;
a parameter that identifies power ramping steps for a PRACH; or
a parameter that identifies a random access response (MSG2) window length.

11. The method of claim 1, further comprising:
determining a response window for receiving a random access response message associated with the first random access message;
searching the response window for the random access response message; and
receiving the random access response message based at least in part on searching the response window.

12. A base station for wireless communication, comprising:
a memory; and
one or more processors coupled to the memory, the one or more processors configured to:
determine a transmission configuration for a first random access message based at least in part on a plurality of parameters associated with a target base station for initiating a backhaul connection,
wherein the transmission configuration includes information associated with a physical random access channel (PRACH) resource associated with transmitting the first random access message, wherein the PRACH resource differs from a PRACH resource associated with a transmission of a random access message by a user equipment,
wherein the transmission configuration identifies a set of time resources associated with transmitting the first random access message, and
wherein the plurality of parameters includes:
  a parameter that identifies a number of synchronization signal (SS) blocks per random access channel (RACH) occasion and a number of contention based preambles per SS block,
  a parameter associated with a threshold for selecting a SS block and corresponding PRACH resource for path-loss estimation and transmission,
  a parameter associated with a threshold for selecting a SS block and corresponding PRACH resource for transmission on a shared uplink carrier,
  a parameter that identifies a PRACH root sequence index.
  a parameter that identifies a subcarrier spacing of a PRACH,
  a parameter that identifies a configuration of an unrestricted set, and
  a parameter that indicates whether transform precoding for MSG3 is enabled; and
transmit the first random access message using the transmission configuration.

13. The base station of claim 12, wherein the transmission configuration includes information associated with a starting frequency location associated with transmitting the first random access message by the base station,
wherein the starting frequency location differs from a starting frequency location associated with a transmission of a random access message by a user equipment.

14. The base station of claim 12, wherein the transmission configuration includes information associated with a number of frequency division multiplexed subcarrier regions associated with transmitting the first random access message by the base station,
wherein the number of frequency division multiplexed subcarrier regions differs from a number of frequency division multiplexed subcarrier regions associated with a transmission of a random access message by a user equipment.

15. The base station of claim 12, wherein the transmission configuration includes information associated with a particular PRACH format associated with transmitting the first random access message by the base station,
wherein the particular PRACH format differs from a PRACH format associated with a transmission of a random access message by a user equipment.

16. The base station of claim 12, wherein the plurality of parameters includes a set of parameters identified by a common RACH configuration information element,
wherein at least one of the set of parameters is different between random access transmissions associated with backhaul links as compared to random access transmission associated with access links.

17. The base station of claim 12, wherein the plurality of parameters includes a set of parameters identified by a dedicated RACH configuration information element,
wherein at least one of the set of parameters is different between random access transmissions associated with backhaul links as compared to random access transmission associated with access links.

18. The base station of claim 17, wherein the set of parameters includes at least one of:
  a parameter associated with identifying resources for contention free random access to a given target cell;
  an identifier associated with a SS block associated with a contention free random access resource and a preamble of the given target cell;
  a preamble index to be used when performing contention free random access upon selecting a candidate beam identified by the SS block;
  a parameter that identifies a mask index for random access resource selection;
  an identifier associated with a channel state information reference signal (CSI-RS) resource defined in a measurement object associated with a serving cell;
  information that identifies a random access occasion to be used when performing contention free random access upon selecting a candidate beam identified by the CSI-RS;
  a random access preamble index to use in random access occasions associated with the CSI-RS; or
  a parameter that identifies a threshold associated with the CSI-RS.

19. The base station of claim 12, wherein the plurality of parameters includes a set of parameters identified by a generic RACH configuration information element,
wherein at least one of the set of parameters is different between random access transmissions associated with backhaul links as compared to random access transmission associated with access links.

20. The base station of claim 19, wherein the set of parameters includes at least one of:
  a parameter that identifies a PRACH index;
  a parameter that identifies a number of PRACH transmission occasions frequency division multiplexed in one time instance;
  a parameter that identifies an offset of a lowest PRACH transmission occasion in a frequency domain with respect to physical resource block 0;
  a parameter that identifies a cyclic shift configuration for a PRACH sequence;
  a parameter that identifies a target power level for a PRACH sequence;
  a parameter that identifies a maximum number of random access preamble transmissions performed before declaring a failure;
  a parameter that identifies power ramping steps for a PRACH; or
  a parameter that identifies a random access response (MSG2) window length.

21. The base station of claim 12, wherein the transmission configuration is determined based at least in part on a combination of the plurality of parameters.

22. The base station of claim 12, wherein, when determining the transmission configuration, the one or more processors are configured to:
  determine the transmission configuration based at least in part on a model that receives, as input, the plurality of parameters.

23. The base station of claim 12, wherein the one or more processors are further configured to:
  determine a response window for receiving a random access response message associated with the first random access message;
  search the response window for the random access response message; and receive the random access response message based at least in part on searching the response window.

24. A non-transitory computer-readable medium storing instructions for wireless communication, the instructions comprising:
one or more instructions that, when executed by one or more processors of a base station, cause the one or more processors to:
determine a transmission configuration for a first random access message based at least in part on a plurality of parameters associated with a target base station for initiating a backhaul connection,
wherein the transmission configuration includes information associated with a physical random access channel (PRACH) resource associated with transmitting the first random access message,
wherein the PRACH resource differs from a PRACH resource associated with a transmission of a random access message by a user equipment,
wherein the transmission configuration identifies a set of time resources associated with transmitting the first random access message, and
wherein the plurality of parameters includes:
a parameter that identifies a number of synchronization signal (SS) blocks per random access channel (RACH) occasion and a number of contention based preambles per SS block,
a parameter associated with a threshold for selecting a SS block and corresponding PRACH resource for path-loss estimation and transmission,
a parameter associated with a threshold for selecting a SS block and corresponding PRACH resource for transmission on a shared uplink carrier,
a parameter that identifies a PRACH root sequence index.
a parameter that identifies a subcarrier spacing of a PRACH,
a parameter that identifies a configuration of an unrestricted set, and
a parameter that indicates whether transform precoding for MSG3 is enabled; and
transmit the first random access message using the transmission configuration.

25. The non-transitory computer-readable medium of claim 24, wherein the transmission configuration includes information associated with a starting frequency location associated with transmitting the first random access message by the base station,
wherein the starting frequency location differs from a starting frequency location associated with a transmission of a random access message by a user equipment.

26. The non-transitory computer-readable medium of claim 24, wherein the transmission configuration includes information associated with at least one of:
a number of frequency division multiplexed subcarrier regions associated with transmitting the first random access message by the base station,
wherein the number of frequency division multiplexed subcarrier regions differs from a number of frequency division multiplexed subcarrier regions associated with a transmission of a random access message by a user equipment; or
a particular PRACH format associated with transmitting the first random access message by the base station,
wherein the particular PRACH format differs from a PRACH format associated with a transmission of a random access message by a user equipment.

27. The non-transitory computer-readable medium of claim 24, wherein the plurality of parameters includes a set of parameters identified by a common RACH configuration information element,
wherein at least one of the set of parameters is different between random access transmissions associated with backhaul links as compared to random access transmission associated with access links.

28. The non-transitory computer-readable medium of claim 24, wherein the plurality of parameters includes a set of parameters identified by a dedicated RACH configuration information element,
wherein at least one of the set of parameters is different between random access transmissions associated with backhaul links as compared to random access transmission associated with access links.

29. The non-transitory computer-readable medium of claim 28, wherein the set of parameters includes at least one of:
a parameter associated with identifying resources for contention free random access to a given target cell;
an identifier associated with a SS block associated with a contention free random access resource and a preamble of the given target cell;
a preamble index to be used when performing contention free random access upon selecting a candidate beam identified by the SS block;
a parameter that identifies a mask index for random access resource selection;
an identifier associated with a channel state information reference signal (CSI-RS) resource defined in a measurement object associated with a serving cell;
information that identifies a random access occasion to be used when performing contention free random access upon selecting a candidate beam identified by the CSI-RS;
a random access preamble index to use in random access occasions associated with the CSI-RS; or
a parameter that identifies a threshold associated with the CSI-RS.

30. The non-transitory computer-readable medium of claim 24, wherein the plurality of parameters includes a set of parameters identified by a generic RACH configuration information element,
wherein at least one of the set of parameters is different between random access transmissions associated with backhaul links as compared to random access transmission associated with access links.

31. An apparatus for wireless communication, comprising:
means for determining a transmission configuration for a first random access message based at least in part on a plurality of parameters associated with a target base station for initiating a backhaul connection,
wherein the transmission configuration includes information associated with a physical random access channel (PRACH) resource associated with transmitting the first random access message,
wherein the PRACH resource differs from a PRACH resource associated with a transmission of a random access message by a user equipment,
wherein the transmission configuration identifies a set of time resources associated with transmitting the first random access message, and
wherein the plurality of parameters includes:
a parameter that identifies a number of synchronization signal (SS) blocks per random access channel (RACH) occasion and a number of contention based preambles per SS block,
a parameter associated with a Group A preamble,
a parameter that identifies an initial value for a contention resolution timer,
a parameter associated with a threshold for selecting a SS block and corresponding PRACH resource for path-loss estimation and transmission,
a parameter associated with a threshold for selecting a SS block and corresponding PRACH resource for transmission on a shared uplink carrier,
a parameter that identifies a PRACH root sequence index,
a parameter that identifies a subcarrier spacing of a PRACH,
a parameter that identifies a configuration of an unrestricted set, and a parameter that indicates whether transform precoding for MSG3 is enabled; and
means for transmitting the first random access message using the transmission configuration.

32. The apparatus of claim 31, wherein the transmission configuration includes information associated with a starting frequency location associated with transmitting the first random access message by the apparatus,
wherein the starting frequency location differs from a starting frequency location associated with a transmission of a random access message by a user equipment.

33. The apparatus of claim 31, wherein the plurality of parameters include a set of parameters identified by a common RACH configuration information element,
wherein at least one of the set of parameters is different between random access transmissions associated with backhaul links as compared to random access transmission associated with access links.

34. The apparatus of claim 31, further comprising:
means for determining a response window for receiving a random access response message associated with the first random access message;
means for searching the response window for the random access response message; and
means for receiving the random access response message based at least in part on searching the response window.

* * * * *